US009163169B2

(12) United States Patent
Balogh et al.

(10) Patent No.: US 9,163,169 B2
(45) Date of Patent: Oct. 20, 2015

(54) ADHESIVE COMPOSITIONS HAVING A REDUCED CURE TIME AND METHODS FOR MAKING AND USING SAME

(71) Applicant: Georgia-Pacific Chemicals LLC, Atlanta, GA (US)

(72) Inventors: Jeffrey Balogh, Covington, GA (US); Jessica D. Jennings, Social Circle, GA (US); Arun Narayan, Lawrenceville, GA (US); Kelly A. Shoemake, Atlanta, GA (US); Bobby L. Williamson, Conyers, GA (US); Jesse Petrella, McDonough, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 13/796,632

(22) Filed: Mar. 12, 2013

(65) Prior Publication Data
US 2013/0240114 A1  Sep. 19, 2013

Related U.S. Application Data

(60) Provisional application No. 61/610,409, filed on Mar. 13, 2012.

(51) Int. Cl.
*C09J 161/12* (2006.01)

(52) U.S. Cl.
CPC ..................................... *C09J 161/12* (2013.01)

(58) Field of Classification Search
CPC ........................................................ C09J 161/12
USPC ........................................................... 524/236
See application file for complete search history.

(56) References Cited

U.S. PATENT DOCUMENTS

| | | | |
|---|---|---|---|
| 1,856,567 A | 5/1932 | Kleinart et al. | |
| 2,525,433 A | 10/1950 | Voet | |
| 2,680,113 A | 6/1954 | Adler et al. | |
| 2,690,973 A | 10/1954 | Voet | |
| 2,937,159 A * | 5/1960 | McKay et al. | 524/252 |
| 3,094,515 A | 6/1963 | Keirstead et al. | |
| 3,158,520 A | 11/1964 | Edmonds et al. | |
| 3,328,354 A * | 6/1967 | Dietrick | 526/59 |
| 3,389,125 A | 6/1968 | Dietrick et al. | |
| 3,503,762 A | 3/1970 | Remer et al. | |
| 3,585,104 A | 6/1971 | Kleinart | |
| 3,726,850 A | 4/1973 | Detroit | |
| 3,769,272 A | 10/1973 | Hintz | |
| 3,841,887 A | 10/1974 | Falkenhag et al. | |
| 4,061,620 A | 12/1977 | Gillern | |
| 4,100,016 A | 7/1978 | Diebold et al. | |
| 4,131,564 A | 12/1978 | Dilling | |
| 4,184,845 A | 1/1980 | Lin | |
| 4,308,203 A | 12/1981 | Lin | |
| 4,355,996 A | 10/1982 | Dilling et al. | |
| 4,373,062 A * | 2/1983 | Brown | 524/841 |
| 4,433,120 A * | 2/1984 | Chiu | 525/501 |
| 4,461,859 A | 7/1984 | Girgis | |
| 4,470,876 A | 9/1984 | Beaupre | |
| 4,536,524 A | 8/1985 | Hart et al. | |
| 4,555,544 A * | 11/1985 | Meyer et al. | 524/595 |
| 4,608,408 A | 8/1986 | Hood et al. | |
| 4,740,591 A | 4/1988 | Dilling et al. | |
| 4,764,596 A | 8/1988 | Lora et al. | |
| 4,889,877 A | 12/1989 | Seitz | |
| 4,936,916 A | 6/1990 | Shinmitsu et al. | |
| 5,435,376 A | 7/1995 | Hart et al. | |
| 5,532,293 A | 7/1996 | Landis | |
| 5,670,571 A | 9/1997 | Gabrielson et al. | |
| 5,674,338 A | 10/1997 | Parker et al. | |
| 5,709,340 A | 1/1998 | Chao | |
| 5,741,592 A | 4/1998 | Lewis et al. | |
| 5,911,923 A | 6/1999 | Work et al. | |
| 5,919,407 A | 7/1999 | Chao | |
| 5,919,557 A | 7/1999 | Lorenz et al. | |
| 5,944,938 A * | 8/1999 | Winterowd et al. | 156/315 |
| 6,004,417 A | 12/1999 | Roesch et al. | |
| 6,084,010 A | 7/2000 | Baetzold et al. | |
| 6,592,990 B2 | 7/2003 | Schwantes | |
| 6,703,127 B2 | 3/2004 | Davis et al. | |
| 6,706,845 B2 | 3/2004 | Ingram et al. | |
| 6,835,334 B2 | 12/2004 | Davis et al. | |
| 6,906,130 B2 | 6/2005 | Tutin et al. | |

(Continued)

FOREIGN PATENT DOCUMENTS

| | | |
|---|---|---|
| JP | 10-088098 A | 4/1998 |
| WO | 92/18557 A1 | 10/1992 |
| WO | 93/21260 A2 | 10/1993 |
| WO | 94/24192 A1 | 10/1994 |
| WO | 2005/062800 A2 | 7/2005 |
| WO | 2006/031175 A1 | 3/2006 |
| WO | 2011/150508 A1 | 12/2011 |

OTHER PUBLICATIONS

NL 6515983 abstract. Sep. 15, 1976.*
International Search Report and The Written Opinion of the International Search Authority for PCT/US2013/030689 mailed Jul. 9, 2013.

*Primary Examiner* — John Uselding
(74) *Attorney, Agent, or Firm* — Ram W. Sabnis

(57) ABSTRACT

Adhesive compositions having a reduced cure time and methods for making and using same are provided. In at least one specific embodiment, the adhesive composition can include a mixture of one or more phenolic-aldehyde resins and one or more cure accelerants. The one or more cure accelerants can be selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, and any mixture thereof. In one or more embodiments, the adhesive composition can also include one or more hardeners.

20 Claims, No Drawings

(56) References Cited

U.S. PATENT DOCUMENTS

| | | |
|---|---|---|
| 7,049,387 B2 | 5/2006 | Dupre, Jr. |
| 7,286,279 B2 | 10/2007 | Yu et al. |
| 7,294,678 B2 | 11/2007 | McGlothlin et al. |
| 7,297,404 B2 | 11/2007 | Bayless |
| 7,300,678 B2 | 11/2007 | Paufique |
| 7,309,500 B2 | 12/2007 | Kim et al. |
| 7,323,039 B2 | 1/2008 | Suzuki et al. |
| 7,344,705 B2 | 3/2008 | Unger |
| 7,368,130 B2 | 5/2008 | Kim et al. |
| 7,368,613 B2 | 5/2008 | Eh |
| 7,374,782 B2 | 5/2008 | Brown |
| 7,375,070 B2 | 5/2008 | Pegelow et al. |
| 7,376,344 B2 | 5/2008 | Manne |
| 7,550,200 B2 | 6/2009 | Hart et al. |
| 2004/0048531 A1* | 3/2004 | Belmares et al. ............... 442/20 |
| 2007/0043173 A1* | 2/2007 | Pirhonen et al. ............... 525/480 |
| 2008/0097041 A1* | 4/2008 | Arbuckle ....................... 525/395 |
| 2008/0280787 A1 | 11/2008 | Rediger et al. |
| 2011/0165398 A1* | 7/2011 | Shoemake et al. ............. 428/220 |
| 2011/0294991 A1 | 12/2011 | Lake et al. |

\* cited by examiner

ADHESIVE COMPOSITIONS HAVING A REDUCED CURE TIME AND METHODS FOR MAKING AND USING SAME

CROSS-REFERENCE TO RELATED APPLICATION

This application claims priority to U.S. Provisional Patent Application having Ser. No. 61/610,409, filed on Mar. 13, 2012, which is incorporated by reference herein.

BACKGROUND

1. Field

Embodiments described herein generally relate to adhesive compositions having a reduced cure time and methods for making and using same. More particularly, such embodiments relate to adhesive compositions having a reduced cure time that include one or more phenolic-aldehyde resins and one or more cure accelerants and methods for making and using same.

2. Description of the Related Art

The preparation of phenolic-aldehyde adhesive compositions, e.g., phenol-resorcinol-formaldehyde (PRF) resins, typically involve forming a solution of a water-soluble, fusible phenolic-aldehyde resin and making an adhesive mix therefrom by adding to the resin solution a methylene donor that can act to cure the resin to a cross-linked state. Common methylene donors or "hardeners" include, for example, aqueous formaldehyde, paraformaldehyde, hexamethylenetetramine, and the like.

One drawback with phenolic-aldehyde adhesives is that these adhesives tend to be slow to cure at ambient or "cold" pressing conditions. A slow cure rate equates to a slow gel time, which translates into slow product production and/or, depending on the particular product, difficulty in making a product with the phenolic-aldehyde adhesives. Slow gel times mean that the phenolic-aldehyde adhesives remain fluid, i.e., have a low viscosity, which it makes it difficult, if not impossible, to evenly apply the adhesive to wood or other substrate surfaces, especially vertically oriented surfaces.

Typically, the cure rate for a particular adhesive mix is often adjusted with an alkali metal hydroxide and/or alkali metal sulfite cure accelerants. For example, alkali metal hydroxides such as sodium hydroxide (NaOH) and/or potassium hydroxide (KOH) are commonly used to speed the cure rate, i.e., reduce the gel time, of phenolic-aldehyde adhesives in wood laminating processes. These accelerants, however, reduce the viscosity of the adhesive. Reducing the viscosity of the adhesive leads to lower quality composite products and/or composite products having inconsistent strength. These accelerants are also incompatible with Radio-Frequency (RF) presses because the metals present tend to cause arcing in the press. Additionally, the degree the cure time can be accelerated with such catalysts or accelerants is limited because there is a point where the metal hydroxides solubilize the adhesive and can cause the composite products to swell during curing of the adhesive.

There is a need, therefore, for improved adhesive compositions having increased viscosity, reduced metal concentration, and/or a reduced cure time for making composite products.

SUMMARY

Adhesive compositions having a reduced cure time and methods for making and using same are provided. In at least one specific embodiment, the adhesive composition can include a mixture of one or more phenolic-aldehyde resins and one or more cure accelerants. The one or more cure accelerants can be selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, and any mixture thereof. The phenolic-aldehyde resin can include at least two phenolic compounds. The at least two phenolic compounds can be selected from the group consisting of: phenol, resorcinol, hydroquinone, catechol, tannins, phloroglucinol, lignins, a bis-phenol, and humic acid. In one or more embodiments, the adhesive composition can also include one or more hardeners.

In at least one specific embodiment, the adhesive composition can include one or more phenolic-aldehyde resins, one or more hardeners, and one or more cure accelerants. The one or more phenolic-aldehyde resins can include at least two phenolic compounds selected from the group consisting of: phenol, resorcinol, hydroquinone, catechol, tannins, phloroglucinol, lignins, a bis-phenol, and humic acid. The one or more hardeners can include one or more alkylene group donors. The one or more cure accelerants can be selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, or any mixture thereof. The one or more cure accelerants can be present in an amount of from about 0.01 wt % to about 1 wt %, based on the combined solids weight of the one or more phenolic-aldehyde resins and the one or more cure accelerants.

In at least one specific embodiment, the method for making a composite product can include contacting a plurality of substrates with an adhesive composition to provide a mixture. The adhesive composition can include one or more phenolic-aldehyde resins, one or more cure accelerants, and one or more hardeners. The one or more cure accelerants can be selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, any combination thereof, or any mixture thereof. The phenolic-aldehyde resin can include at least two phenolic compounds. The at least two phenolic compounds can be selected from the group consisting of: phenol, resorcinol, hydroquinone, catechol, tannins, phloroglucinol, lignins, a bis-phenol, and humic acid. The method can also include at least partially curing the adhesive composition to produce a composite product.

In at least one specific embodiment, the composite product can include a plurality of substrates and a cured adhesive composition. The adhesive composition, prior to curing, can include one or more phenolic-aldehyde resins, one or more cure accelerants, and one or more hardeners. The one or more cure accelerants can be selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, any combination thereof, or any mixture thereof. The phenolic-aldehyde resin can include at least two phenolic compounds. The at least two phenolic compounds can be selected from the group consisting of: phenol, resorcinol, hydroquinone, catechol, tannins, phloroglucinol, lignins, a bis-phenol, and humic acid.

In at least one specific embodiment, the adhesive composition can include a mixture of one or more tannins, one or more lignins, or a combination thereof, and or more cure accelerants. The one or more cure accelerants can be selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, any combination thereof, or any mixture thereof. In one or more embodiments, the adhesive composition can also include one or more hardeners.

DETAILED DESCRIPTION

The adhesive composition can include one or more phenolic-aldehyde resins and one or more cure accelerants. As used herein, the term "cure accelerant" refers to a compound comprising one or more amine functional groups. The one or more cure accelerants can include, but are not limited to, ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, any combination thereof, or any mixture thereof. In one or more embodiments, the adhesive composition can also include one or more hardeners or cross-linkers mixed, blended, or otherwise combined therewith. As used herein, the term "hardener" refers to a compound that includes one or more alkylene group donors. The adhesive composition that includes the hardener can be applied to or otherwise contacted with a plurality of substrates and at least partially cured to produce a composite product, such as a lignocellulose based composite product. The phenolic-aldehyde resin, cure accelerant, and hardener, when combined with one another to produce the adhesive composition, can crosslink with one another to form an at least partially cured adhesive composition. A mixture that includes the phenolic-aldehyde resin and cure accelerant, but not the hardener, can be referred to as the "phenolic-aldehyde resin/cure accelerant mixture."

As used herein, the terms "curing," "cured," and similar terms are intended to refer to the structural and/or morphological change that occurs in the adhesive composition as it is cured to cause covalent chemical reaction (crosslinking), ionic interaction or clustering, improved adhesion to a substrate, phase transformation or inversion, and/or hydrogen bonding. As used herein, the phrases "at least partially cure," "at least partially cured," and similar terms are intended to refer to an adhesive composition that has undergone at least some covalent chemical reaction (crosslinking), ionic interaction or clustering, improved adhesion to the substrate, phase transformation or inversion, and/or hydrogen bonding, but may also be capable of undergoing additional covalent chemical reaction (crosslinking), ionic interaction or clustering, improved adhesion to the substrate, phase transformation or inversion, and/or hydrogen bonding.

The rate at which the crosslinking reactions occur can affect what is commonly referred to as the adhesive composition "working life." Working life usually refers to the time during which the viscosity and advancement of the adhesive composition is low enough to permit application of the adhesive composition to a substrate. The terms "pot life" and "gel time" usually refers to the time required for the adhesive composition to cure, which can be measured a number of ways, but near the end of the gel time the viscosity of the adhesive composition is too high for satisfactory application of the adhesive to a substrate. As the crosslinking reactions progress the viscosity of the adhesive composition increases. As such, the gel time or pot life is related to the working life, with the gel time and pot life being longer than the working life. For example, the shorter the gel time of the adhesive composition equals a shorter working life and, conversely, the longer the gel time of the adhesive composition equals a longer working life.

It has been surprisingly and unexpectedly discovered that the adhesive composition that includes the cure accelerant, the phenolic-aldehyde resin, and optionally the hardener can be used to produce a composite product at a substantially reduced cure time as compared to a comparative product made with a comparative adhesive composition, where the comparative adhesive composition contains the same phenolic-aldehyde resin and hardener, but is free from the cure accelerant. In other words, the cure accelerant can be combined with the phenolic-aldehyde resin and the optional hardener in order to reduce the time required to at least partially cure the adhesive composition a sufficient amount for a given product being produced. As such, the cure time of the adhesive composition can be selectively reduced, relative to the comparative adhesive composition, by altering, controlling, or otherwise adjusting the amount of the cure accelerant in the adhesive composition.

Depending on the particular use or application for the adhesive composition, the viscosity of the adhesive composition can increase to a point at which it can no longer be efficiently or effectively applied, e.g., to a plurality of wood particles, a wood composite, and/or veneer substrate. When the viscosity of the adhesive composition increase causes the adhesive composition to be too thick for use the usable pot life of the binder has been exceeded. The useable pot life of the adhesive composition can range from a low of about 1 minute, about 2 minutes, about 3 minutes, about 5 minutes, about 10 minutes, about 20 minutes, about 30 minutes, about 45 minutes, or about 60 minutes to a high of about 90 minutes, about 150 minutes, about 180 minutes, about 200 minutes, or about 220 minutes, about 250 minutes, about 275 minutes, about 300 minutes, about 330 minutes, or about 350 minutes depending, at least in part, on the particular product being made with the adhesive composition.

The viscosity of the adhesive composition can range from a low of about 100 centipoise ("cP"), about 500 cP, about 1,000 cP, or about 1,500 cP to a high of about 5,000 cP, about 10,000 cP, about 15,000 cP, or about 20,000 cP at a temperature of 25° C. The viscosities of the adhesive composition discussed and described herein are measured at a temperature of 25° C. unless otherwise indicated. Depending on the particular method of applying the adhesive composition to one or more substrates, the viscosity can widely vary. For example, in a spray application, the adhesive composition can preferably have a viscosity ranging from about 1,000 cP to about 2,000 cP, or about 1,300 cP to about 1,800 cP. In another example, if the adhesive composition is used in an extrusion process, the viscosity can be about 2,000 cP or more, about 5,000 cP or more, about 10,000 cP or more, or about 15,000 cP or more. The adhesive composition that includes the phenolic-aldehyde resin, cure accelerant, and hardener can have a viscosity of about 500 cP, about 1,000 cP, or about 1,500 cP to a high of about 5,000 cP, about 10,000 cP, about 15,000 cP, or about 20,000 cP at a time of about 1 to 2 minutes after combining the three components, i.e., the phenolic-aldehyde resin, cure accelerant, and hardener, with one another.

The viscosity of the adhesive composition, i.e., after the phenolic-aldehyde resin, cure accelerant, and hardener ("the three components") have been combined with one another, can be about 500 cP to about 2,500 cP at a time of about 2 minutes to about 5 minutes after the three components are combined and the viscosity can increase up to about 50,000 cP to about 100,000 cP after about 90 minutes to about 120 minutes. In another example, the viscosity of the adhesive composition containing the three components can have a viscosity of about 500 cP to about 2,500 cP at a time of about 2 minutes to about 5 minutes after the three components are combined and the viscosity can increase up to about 50,000 cP to about 100,000 cP after about 10 minutes to about 30 minutes. In another example, the viscosity of the adhesive composition containing the three components can have a viscosity of about 500 cP to about 2,500 cP at a time of about 2 minutes to about 5 minutes after the three components are combined and the viscosity can increase up to about 50,000 cP to about 100,000 cP after about 30 minutes to about 60 minutes. In another example, the viscosity of the adhesive composition containing the three components can have a viscosity of about 500 cP to about 2,500 cP at a time of about 2 minutes to about 5 minutes after the three components are combined and the viscosity can increase up to about 50,000 cP to about 100,000 cP after about 60 minutes to about 90 minutes. In another example, the viscosity of the adhesive composition containing the three components can have a viscosity of about 500 cP to about 2,500 cP at a time of about 2 minutes to about 5 minutes after the three components are combined and the viscosity can increase up to about 50,000 cP to about 100,000 cP after about 120 minutes to about 150 minutes. In another example, the viscosity of the adhesive composition containing the three components can have a viscosity of about 500 cP to about 2,500 cP at a time of about 2 minutes to about 5 minutes after the three components are combined and the viscosity can increase up to about 50,000 cP to about 100,000 cP after about 150 minutes to about 180 minutes. In another example, the viscosity of the adhesive composition containing the three components can have a viscosity of about 500 cP at a time of about 2 minutes after the three components are combined and can increase up to about 50,000 cP to about 100,000 cP after about 180 minutes to about 200 minutes. In another example, the viscosity of the adhesive composition containing the three components can have a viscosity of about 500 cP to about 2,500 cP at a time of about 2 minutes to about 5 minutes after the three components are combined and the viscosity can increase up to about 50,000 cP to about 100,000 cP after about 200 minutes to about 230 minutes.

The time required to cure the adhesive compositions, as compared to comparative adhesive compositions, can be reduced by about 1% to about 99%, depending, at least in part, on the amount of cure accelerant mixed, blended, or otherwise combined with the phenolic-aldehyde resin. In another example, the cure time of the adhesive composition that includes the cure accelerant can be reduced, relative to the comparative adhesive composition, by an amount ranging from a low of about 5%, about 10%, about 20%, or about 30%, to a high of about 40%, about 50%, about 60%, about 70%, about 80%, or about 90%, depending, at least in part, on the amount of cure accelerant present in the adhesive composition. In another example, the cure time of the adhesive composition, relative to the comparative adhesive composition, can be reduced by at least 5%, at least 15%, at least 25%, at least 35%, at least 45%, at least 55%, at least 65%, or at least 75%.

The adhesive composition can have a gel time or pot life of from a low of about 2 minutes, about 5 minutes, about 10 minutes, about 15 minutes, or about 20 minutes to a high of about 100 minutes, about 120 minutes, about 140 minutes, about 160 minutes, about 180 minutes, about 200 minutes, about 220 minutes, about 240 minutes, or about 300 minutes. For example, the adhesive composition can have a gel time or pot life ranging from about 10 minutes to about 240 minutes, about 20 minutes to about 180 minutes, about 10 minutes to about 30 minutes, about 5 minutes to about 60 minutes, about 30 minutes to about 90 minutes, about 15 minutes to about 180 minutes, about 180 minutes to about 240 minutes, or about 10 minutes to about 150 minutes. In another example, the adhesive composition can have a gel time or pot life less than about 240 minutes or less than about 210 minutes, or less than about 180 minutes, but at least 2 minutes, at least 3 minutes, at least 5 minutes, at least 10 minutes, at least 15 minutes, or at least 20 minutes. In at least one specific example, the adhesive composition can have a pot life ranging from about 80 minutes to about 120 minutes in the winter time or about 120 minutes to about 150 minutes in the summer time, which can be preferred for the production of glulam composite products. In at least one other specific example, the adhesive composition can have a pot life ranging from about 2 minutes to about 20 minutes, about 2 minutes to about 10 minutes, or about 2 minutes to about 5 minutes, which can be preferred for the production of I-beams that can be manufactured at a rate of 100 ft/min or more, about 150 ft/minute or more, about 200 ft/min or more, or about 250 ft/min or more.

The adhesive composition can have a working life of from a low of about 2 minutes, about 5 minutes, about 10 minutes, about 15 minutes, or about 20 minutes to a high of about 100 minutes, about 120 minutes, about 140 minutes, about 160 minutes, about 180 minutes, about 200 minutes, about 220 minutes, about 240 minutes, or about 270 minutes. For example, the adhesive composition can have a working life ranging from about 10 minutes to about 240 minutes, about 20 minutes to about 180 minutes, about 10 minutes to about 30 minutes, about 5 minutes to about 60 minutes, about 30 minutes to about 90 minutes, about 15 minutes to about 180 minutes, about 180 minutes to about 240 minutes, or about 10 minutes to about 150 minutes. In another example, the adhesive composition can have a working life less than about 240 minutes or less than about 210 minutes, or less than about 180 minutes, but at least 2 minutes, at least 3 minutes, at least 5 minutes, at least 10 minutes, at least 15 minutes, or at least 20 minutes. In at least one specific example, the adhesive composition can have a working life ranging from about 80 minutes to about 120 minutes in the winter time or about 120 minutes to about 150 minutes in the summer time, which can be preferred for the production of glulam composite products. In at least one other specific example, the adhesive composition can have a working life ranging from about 2 minutes to about 20 minutes, about 2 minutes to about 10 minutes, or about 2 minutes to about 5 minutes, which can be preferred for the production of I-beams that can be manufactured at a rate of 100 ft/min or more, about 150 ft/minute or more, about 200 ft/min or more, or about 250 ft/min or more.

The gel time of the adhesive composition can be determined according to any suitable method. One suitable method for determining or estimating the gel time of the adhesive composition can be as follows. A sample of the adhesive composition, e.g., about 20 g to about 30 g can be added to an appropriate container, e.g., a beaker, a 2.5 cm×11.5 cm centrifuge tube, or the like, and the temperature can be adjusted to about 25° C. The container can be tapped to remove air bubbles from the adhesive composition. The container can be placed in a water bath (to maintain the temperature of the adhesive composition at about 25° C.) under a gel timer equipped with a plunger. The surface of the adhesive composition should be below the surface of the water. A ring or other appropriate device can be used to position and hold the container in the gel time measuring device. The end of the gel timer plunger can be immersed in the adhesive composition and centered within the tube. The gel timer can be turned on. The time at which the gel timer stops can be recorded. A suitable gel timer can include the Techne Gelation Timer, model no. F925P.

Another suitable method for determining or estimating the gel time of the adhesive composition can be as follows. The desired amount of phenolic-aldehyde resin, cure accelerant, and hardener can be added to a beaker and mixed. The timer can be started when mixing begins. The temperature of the adhesive composition can be adjusted to about 25° C. A spindle can be inserted into the beaker and centered therein and attached to the viscometer. The viscometer can be started and the viscosity can be recorded periodically, e.g., every 2 minutes, until the adhesive composition reaches a desired viscosity, e.g., 100,000 cP. When the adhesive composition reaches the desired viscosity the viscometer can be stopped and the spindle can be removed and cleaned. A suitable viscometer can include a Brookfield Viscometer, Model LVF, with a number 4 spindle or equivalent. The mixture can be paced under the viscometer; the viscometer can be started, and after about 2 minute the viscosity pointer can be locked and the viscosity periodically recorded until the desired viscosity is reached.

The amount of the cure accelerant combined with the phenolic-aldehyde resin can depend, at least in part, on one or more factors, e.g., a desired gel time or pot life, the particular composite product to be produced with the adhesive composition, the method to be used for at least partially curing the adhesive composition, and the like. The adhesive composition, prior to the addition of the hardener, can have a concentration of the cure accelerant ranging from a low of about 0.05 wt %, about 0.1 wt %, about 0.2 wt %, or about 0.4 wt % to a high about 0.6 wt %, about 0.7 wt %, about 0.8 wt %, about 1 wt %, about 1.4 wt %, about 1.8 wt %, or about 2 wt %, based on the combined solids weight of the phenolic-aldehyde resin and the cure accelerant. As used herein, the solids content of the adhesive composition, the phenolic-aldehyde resin, the cure accelerant, the hardener, and the like, as understood by those skilled in the art, can be measured by determining the weight loss upon heating a small sample, e.g., 1-5 grams of the adhesive composition, to a suitable temperature, e.g., 105° C. to 125° C., and a time sufficient to remove the liquid. By measuring the weight of the sample before and after heating, the percent solids in the sample can be directly calculated or otherwise estimated.

Similar to the cure accelerant, the amount of hardener combined with the resin and the cure accelerant can depend, at least in part, on one or more factors, e.g., a desired gel time, the particular composite product to be produced with the adhesive composition, the method to be used for at least partially curing the adhesive composition, and the like. The adhesive composition can have a concentration of the phenolic-aldehyde resin ranging from a low of about 60-80 60 wt %, about 63 wt %, about 65 wt %, or about 67 wt % to a high of about 73 wt %, about 75 wt %, about 77 wt %, or about 80 wt %, based on the combined solids weight of the phenolic-aldehyde resin, the cure accelerant, and the hardener. The adhesive composition can have a concentration of the cure accelerant ranging from a low of about 0.1 wt %, about 0.15 wt %, about 0.18 wt %, about 0.2 wt %, about 0.23 wt %, about 0.25 wt %, about 0.27 wt %, or about 0.3 wt % to a high of about 0.5 wt %, about 0.55 wt %, about 0.6 wt %, about 0.65 wt %, about 0.7 wt %, about 0.75 wt %, about 0.8 wt %, about 0.85 wt %, or about 0.9 wt %, based on the combined solids weight of the phenolic-aldehyde resin, the cure accelerant, and the hardener. The adhesive composition can have a concentration of the hardener ranging from a low of about 20 wt %, about 23 wt %, about 25 wt %, or about 27 wt % to a high of about 33 wt %, about 35 wt %, about 37 wt %, about 40 wt %, based on the combined solids weight of the phenolic-aldehyde resin, the cure accelerant and the hardener.

In one example, the adhesive composition can contain from about 30 wt % to about 70 wt % phenolic-aldehyde resin, about 0.1 wt % to about 0.8 wt % cure accelerant, and about 20 wt % to about 30 wt % hardener, based on the combined solids weight of the phenolic-aldehyde resin, the cure accelerant, and the hardener. In another example, the adhesive composition can contain from about 60 wt % to about 80 wt % phenolic-aldehyde resin, about 0.2 wt % to about 0.65 wt % cure accelerant, and about 20 wt % to about 40 wt % hardener, based on the combined solids weight of the phenolic-aldehyde resin, the cure accelerant, and the hardener. In another example, the adhesive composition can contain from about 67 wt % to about 73 wt % phenolic-aldehyde resin, about 0.17 wt % to about 0.75 wt % cure accelerant, and about 27 wt % to about 33 wt % hardener, based on the combined solids weight of the phenolic-aldehyde resin, the cure accelerant, and the hardener.

The adhesive composition can have a molar ratio of the aldehyde component or aldehyde compound ($A_{CA}$) to the phenolic component or phenolic compound in the adhesive ($P_{CA}$) ranging from a low of about 1:1, about 1.1:1, about 1.2:1, or about 1.3:1 to a high of about 1.4:1, about 1.5:1, about 1.6:1, or about 1.7:1. The aldehyde component ($A_{CA}$) includes any aldehyde compounds contained in the phenolic-aldehyde resin ($A_R$) and the hardener ($A_H$). Similarly, the phenolic component ($P_{CA}$) includes any phenolic compounds present in the phenolic-aldehyde resin ($P_R$), e.g., phenol, resorcinol, tannin, any combination thereof, or any mixture thereof, and any phenolic compounds present in the hardener ($P_H$). For example, the adhesive composition can have a molar ratio of the aldehyde component ($A_{CA}$) to the phenolic component ($P_{CA}$) ranging from about 1:1 to about 1.7:1, about 1:1 to a about 1.65:1, about 1.05:1 to a about 1.1:1, about 1.1:1 to about 1.5:1, about 1.1:1 to about 1.4:1, about 1.15:1 to about 1.25:1, or about 1.1:1 to about 1.3:1. In another example, the adhesive composition can have a molar ratio of the aldehyde component ($A_{CA}$) to the phenolic component ($P_{CA}$) of about 1.1:1, about 1.15:1, about 1.2:1, about 1.25:1, about 1.3:1, about 1.35:1, or about 1.4:1.

The adhesive composition can include one or more liquid mediums in an amount sufficient to produce an adhesive composition having a solids concentration ranging from a low of about 40 wt %, about 45 wt %, or about 50 wt % to a high of about 60 wt % about 65 wt %, about 70 wt %, or about 75 wt %, based on a total weight of the adhesive composition. For example, the amount of liquid medium combined with the adhesive composition can be sufficient to produce an adhesive composition having a solids concentration ranging from about 45 wt % to about 65 wt %, about 50 wt % to about 65 wt %, about 53 wt % to about 57 wt %, about 45 wt % to about 50 wt %, or about 60 wt % to about 70 wt %, based on the total weight of the adhesive composition.

The liquid medium can be or include water, N-methylpyrrolidone ("NMP"), methanol, ethanol, n-propanol, iso-propanol, butanol, any combination thereof, or any mixture thereof. The water can be fresh water or process water. The use of iso-propanol can also accelerate rate at which the adhesive composition cures. Not wishing to be bound by theory, it is believed that the presence of isopropanol can increase the cure rate of the adhesive composition because it does not form adducts with formaldehyde, as methanol and ethanol do, which temporarily tie-up formaldehyde during cure of the adhesive composition. This allows the formaldehyde to be more fully available for reaction to cure the adhesive.

In at least one example, a sufficient amount of water can be combined with the resin to provide an adhesive composition having a solids concentration ranging from about 40 wt % about 70 wt %, about 55 wt % to about 65 wt %, about 50 wt % to about 60 wt %, about 40 wt % to about 50 wt %, about 53 wt % to about 57 wt %, about 60 wt % to about 70 wt %, or about 51 wt % to about 59 wt %, based on the total weight of the adhesive composition.

The adhesive composition can have a concentration of the phenolic-aldehyde resin ranging from a low of about 50 wt %, about 55 wt %, about 60 wt %, or about 65 wt % to a high of about 70 wt %, about 75 wt %, about 80 wt %, or about 85 wt %, based on the total weight, i.e., solids and liquids, of the adhesive composition, i.e., the phenolic-aldehyde resin, the cure accelerant, and the hardener. The adhesive composition can have a concentration of the cure accelerant ranging from a low of about 0.05 wt %, about 0.07 wt %, about 0.1 wt %, about 0.13 wt %, about 0.15 wt %, about 0.17 wt %, about 0.2 wt %, or about 0.23 wt % to a high of about 0.3 wt %, about 0.33 wt %, about 0.35 wt %, about 0.37 wt %, about 0.4 wt %, about 0.43 wt %, about 0.45 wt %, about 0.47 wt %, or about 0.5 wt %, based on the total weight of the phenolic-aldehyde resin, the cure accelerant, and the hardener. In another example, the adhesive composition can have a concentration of the cure accelerant ranging from a low of about 0.05 wt %, about 0.08 wt %, about 0.1 wt %, about 0.15 wt %, about 0.2 wt %, about 0.25 wt %, or about 0.3 wt % to a high of about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, or about 2 wt %, based on the total weight of the phenolic-aldehyde resin, the cure accelerant, and the hardener. The adhesive composition can have a concentration of the hardener ranging from a low of about 15 wt %, about 20 wt %, about 23 wt %, about 25 wt %, or about 27 wt % to a high of about 33 wt %, about 35 wt %, about 40 wt %, about 45 wt %, or about 50 wt %, based on the total weight of the phenolic-aldehyde resin, the cure accelerant, and the hardener.

In one example, the adhesive composition can contain from about 60 wt % to about 80 wt % phenolic-aldehyde resin, about 0.1 wt % to about 0.4 wt % cure accelerant, and about 20 wt % to about 40 wt % hardener, based on the total weight of the phenolic-aldehyde resin, the cure accelerant, and the hardener. In another example, the adhesive composition can contain from about 65 wt % to about 75 wt % phenolic-aldehyde resin, about 0.1 wt % to about 0.37 wt % cure accelerant, and about 20 wt % to about 40 wt % hardener, based on the total weight of the phenolic-aldehyde resin, the cure accelerant, and the hardener. In another example, the adhesive composition can contain from about 67 wt % to about 73 wt % phenolic-aldehyde resin, about 0.15 wt % to about 0.35 wt % cure accelerant, and about 27 wt % to about 33 wt % hardener, based on the total weight of the phenolic-aldehyde resin, the cure accelerant, and the hardener.

A long pot life for the adhesive composition can be beneficial; however, a pot life on the order of a minute or two can be more than acceptable. However, the pot life of the adhesive composition that includes the phenolic-aldehyde resin, cure accelerant, and hardener, can be extended if desired. Extending the pot life of the adhesive composition can allow for process upsets that can potentially be encountered during the production of products such as composite wood products.

The cure accelerant and the phenolic-aldehyde resin can be mixed, blended or otherwise combined with one another to form the phenolic-aldehyde resin/cure accelerant mixture. The blending or mixing procedure can be carried out at ambient temperature or at a temperature greater than ambient temperature, for example a temperature ranging from a low of about 20° C., about 30° C., or abut 40° C. to a high of about 50° C., about 60° C., about 70° C. The blending or mixing procedure can also be carried out under a vacuum, at atmospheric pressure, or at a pressure greater than atmospheric pressure, e.g., 350 kPa. In one example, the cure accelerant and the resin can be mixed with one another at atmospheric pressure and at a temperature ranging from about 20° C. to about 30° C. The phenolic-aldehyde resin/cure accelerant mixture can be used immediately or stored for a period of time. The phenolic-aldehyde resin/cure accelerant mixture can be diluted with water to have a solids concentration suitable for the desired method of application.

The phenolic-aldehyde resin/cure accelerant mixture that includes the phenolic-aldehyde resin and the cure accelerant, without the hardener, can be stored for a time ranging anywhere from a few hours to months or even more than one year. For example, the adhesive composition, prior to adding the hardener thereto, can be stored for about 1 week or more, about 2 weeks or more, about 3 weeks or more, about 1 month, about 2 months, or about 3 months, about 4 months, about 5 months, about 6 months, about 9 months, about 10 months, about 11 months, about 12 months or more. The phenolic-aldehyde resin and the cure accelerant can remain as a mixture with one another, i.e., the phenolic-aldehyde resin and the cure accelerant do not react or are substantially unreactive with one another in the absence of the hardener. Said another way, the phenolic-aldehyde resin and the cure accelerant can remain as separate, discrete components in the phenolic-aldehyde/cure accelerant mixture that is free from the hardener. In other words, the cure accelerant does not react with the phenolic component, the aldehyde component, or the phenolic-aldehyde resin such that the cure accelerant is incorporated into the phenolic-aldehyde resin. The cure accelerant interacts and/or reacts with the hardener and/or at least accelerates the cross-linking reactions between the hardener and the phenolic-aldehyde resin when the three components are combined with one another.

In the phenolic-aldehyde resin/cure accelerant mixture, the addition or presence of the cure accelerant to the phenolic-aldehyde resin can reduce the viscosity of the phenolic-aldehyde resin by less than about 25%, less than about 20%, less than about 15%, less than about 10%, less than about 5%, less than about 3%, less than about 2%, or less than about 1%, as compared to the phenolic-aldehyde resin before mixing with the cure accelerant. For example, the viscosity of the phenolic-aldehyde resin/cure accelerant mixture can be reduced by about 1% to about 5%, about 0.1% to about 1%, about 3% to about 10%, about 5% to about 15%, about 2% to about 6%, about 4% to about 8%, about 6% to about 12%, or about 3% to about 9%, as compared to the phenolic-aldehyde resin before mixing with the cure accelerant. The viscosity of the adhesive composition can be determined using a Brookfield Viscometer at a temperature of 25° C. For example, the Brookfield viscometer, Model LVF with a no. 4 spindle can be used.

As noted above, suitable cure accelerants can include, but are not limited to, ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing one or more sulfur functional groups ($—SO_x$), any combination thereof, or any mixture thereof. Suitable primary amines, secondary amines, and tertiary amines can be amine compounds having formulas $NH_2R_1$, $NHR_1R_2$, and $NR_1R_2R_3$, respectively, where each $R_1$, $R_2$, and $R_3$ is independently selected from alkyls, cycloalkyls, heterocycloalkyls, aryls, heteroaryls, and substituted aryls. The alkyl can include branched or unbranched alkyls having from 1 to about 15 carbon atoms or more preferably from 1 to about 8 carbon atoms. Illustrative alkyls can include, but are not limited to, methyl, ethyl, n-propyl, isopropyl, n-butyl, sec butyl, t-butyl, n-pentyl, n-hexyl, and ethylhexyl. The cycloalkyls can include from 3 to 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In one or more embodiments, aryl substituents can have from 1 to about 20 carbon atoms. The term "heteroatom-containing," as in a "heteroatom-containing cycloalkyl group," refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted," as in "substituted aryls," refers to a molecule or molecular fragment in which at least one hydrogen atom bound to a carbon atom is replaced with one or more substituents that are functional groups such as hydroxyl, alkoxy, alkylthio, phosphino, amino, halo, silyl, and the like. Illustrative primary amines can include, but are not limited to, methylamine and ethylamine. Illustrative secondary amines can include, but are not limited to, dimethylamine and diethylamine. Illustrative tertiary amines can include, but are not limited to, trimethylamine and triethylamine.

An alkanolamine is defined as a compound that has both amino and hydroxyl functional groups. The alkanolamine can be aliphatic alkanolamines, cyclo-alkanol amines, aromatic alkanolamines, or a combination thereof. Illustrative aliphatic alkanolamines can include, but are not limited to, monoethanolamine ("MEA"), diethanolamine ("DEA"), triethanolamine ("TEA"), 2-(2-aminoethoxy)ethanol, aminoethyl ethanolamine, aminobutanol and other aminoalkanols, any combination thereof, or any mixture thereof. Illustrative cyclo-alkanolamines can include, but are not limited to, 3-ethyl-2-methyl-2-(3-methylbutyl)-1,3-oxazolidine, 3-ethyl-2-methyl-2-(3-methylbutyl)-1,3-oxazolidine, or a combination thereof. Illustrative aromatic amines can include, but are not limited to, benzyl amine, aniline, ortho-toluidine, meta-toluidine, para-toluidine, n-methyl aniline, N—N'-dimethyl aniline, diphenyl and triphenyl amines, 1-naphthylamine, 2-naphthylamine, 4-aminophenol, 3-aminophenol, 2-aminophenol, any combination thereof, or any mixture thereof. Illustrative polyamines can include, but are not limited to, diethylenetriamine ("DETA"), triethylenetetramine ("TETA"), tetraethylenepentamine ("TEPA"), 1,3-propanediamine, 1,4-butanediamine, polyamidoamines, polyethylenimines, any combination thereof, or any mixture thereof.

Polyamines include organic compounds having two or more primary amino groups ($—NH_2$). Illustrative polyamines can include, but are not limited to, ethylene diamine, 1,3-diaminopropane, hexamethylenediamine, any combination thereof, or any mixture thereof.

An amide is an organic compound that contains the functional group consisting of: a carbonyl group (R—C=O) linked to a nitrogen atom (N). Illustrative amides can include, but are not limited to, acetamide (ethanamide), dicyandiamide, and the like, any combination thereof, or any mixture thereof. Polyamides are organic compounds that contain two or more amide groups. Illustrative polyamides can include, but are not limited to, polyamide epichlorohydrin adducts, polyamide epichlorohydrin resins, and/or polyamide epichlorohydrin polymers.

The one or more compounds containing one or more amine functional groups and one or more sulfur functional groups can include, but are not limited to, sulfamic acid, ammonium sulfamate, ammonium sulfate, ammonium bisulfate, ammonium sulfite, ammonium bisulfite, any combination thereof, or any mixture thereof. The sulfur functional group in the compound that includes the amine functional group and the sulfur functional group can be represented by the general formula: $—SO_x$, where x is equal to 2, 3, or 4. Other suitable cure accelerants can include one or more thiol compounds. Illustrative thiols can include, but are not limited to, methanethiol, ethanethiol, 1-propanethiol, 2-propanethiol, butanethiol, pentanethiols, any combination thereof, or any mixture thereof.

The phenolic component(s) or phenolic compound(s) of the phenolic-aldehyde resin can include phenol, a variety of substituted phenolic compounds, unsubstituted phenolic compounds, or any combination of substituted and/or unsubstituted phenolic compounds. For example, the phenolic component can be or include phenol itself, i.e., mono-hydroxy benzene. In another example, the phenolic component can be or include resorcinol, i.e., benzene-1,3-diol. In another example, the phenolic component can be or include hydroquinone, i.e., benzene-1,4-diol. In another example, the phenolic component can be or include catechol, i.e., 1,2-dihydroxybenzene. In another example, the phenolic component can be or include one or more tannins. In another example, the phenolic component can be or include lignin. In another example, the phenolic component can be or include phloroglucinol, i.e., 1,3,5-trihydroxybenzene. In another example, the phenolic component can be or include humic acid. In another example, the phenolic component can be or include a bis-phenol. In another example, the phenolic component can be a mixture of two or more of phenol, resorcinol, hydroquinone, catechol, tannin, phloroglucinol, lignin, and humic acid. In another example, the phenolic component of the phenolic-aldehyde resin can include at least 2, at least 3, at least 4, at least 5, at least 6, at least 7, at least 8, at least 9, at least 10, or more phenolic compounds. For example, the phenolic component of the phenolic-aldehyde resin can include at least two phenolic compounds selected from phenol, resorcinol, hydroquinone, catechol, tannins, phloroglucinol, lignin, one or more bis-phenols, and humic acid.

Particular examples to two phenolic compounds that can be used to make-up at least a portion of the phenolic component in the phenolic-aldehyde resin can include, but are not limited to, phenol and resorcinol, phenol and one or more tannins, phenol and catechol, phenol and hydroquinone, resorcinol and one or more tannins, resorcinol and catechol, resorcinol and hydroquinone, catechol and one or more tannins, catechol and hydroquinone, hydroquinone and one or more tannins, phenol and lignin, phenol and a bis-phenol, e.g., bis-phenol A, phenol and humic acid, phenol and phloroglucinol, phloroglucinol and lignin, tannin and phloroglucinol, tannin and lignin, and tannin and a bis-phenol. Illustrative bis-phenols can include, but are not limited to, bis-phenol A, bis-phenol B, bis-phenol C, bis-phenol E, bis-phenol F, bis phenol G, or any mixture thereof.

Examples of substituted phenolic compounds can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. The resorcinol component, if present in the phenolic-aldehyde based resin, can be provided in a variety of forms. For example, the resorcinol component can be provided as a white/off-white solid or flake and/or the resorcinol component can be heated and supplied as a liquid. Any form of the resorcinol can be used with any form of the aldehyde component to make the phenolic-aldehyde resin. In addition to resorcinol, other dihydric phenols can include, but are not limited to, catechol, hydroquinone, bis-phenol A, bis-phenol F, any combination thereof, or any mixture thereof. Preferably, about 70 wt %, about 75 wt %, about 80 wt %, about 85 wt %, about 90 wt %, or about 95 wt % or more of the phenolic component includes at least two of phenol, resorcinol, hydroquinone, catechol, tannins, phloroglucinol, lignins, a bis-phenol, and humic acid.

A phenolic-aldehyde resin that includes two phenolic compounds, i.e., a first phenolic compound and a second phenolic compound, can have a concentration of the first phenolic compound ranging from about 1 wt % to about 99 wt %, based on the combined weight of the first and second phenolic compounds. In another example, a phenolic-aldehyde resin that includes two phenolic compounds can have a concentration of the first phenolic compound of about 10 wt % or more, about 20 wt % or more, about 30 wt % or more, about 40 wt % or more, about 50 wt % or more, about 60 wt % or more, about 70 wt % or more, about 80 wt % or more, about 90 wt % or more, or about 95 wt % or more, based on the combined weight of the first and second phenolic compounds.

As used herein, the term "tannin" refers to both hydrolyzable tannins and condensed tannins. As such, the adhesive composition can include hydrolyzable tannins, condensed tannins, or a combination of hydrolyzable tannins and condensed tannins. Illustrative genera of shrubs and/or trees from which suitable tannins can be derived can include, but are not limited to, *Acacia, Castanea, Vachellia, Senegalia, Terminalia, Phyllanthus, Caesalpinia, Quercus, Schinopsis, Tsuga, Rhus, Juglans, Carya*, and *Pinus*, any combination thereof, or any mixture thereof. In another example, genera from which suitable tannins can be derived can include, but are not limited to, *Schinopsis, Acacia*, or a combination thereof. In another example, genera from which suitable tannins can be derived can include, but are not limited to, *Pinus, Carya*, or a combination thereof.

Hydrolyzable tannins are mixtures of simple phenols such as pyrogallol and ellagic acid and of esters of a sugar, e.g., glucose, with gallic and digallic acids. Illustrative hydrolyzable tannins can include, but are not limited to, extracts recovered from *Castanea sativa*, (e.g., chestnut), *Terminalia* and *Phyllanthus* (e.g., myrabalans tree species), *Caesalpinia coriaria* (e.g., divi-divi), *Caesalpinia spinosa*, (e.g., tara), algarobilla, valonea, and *Quercus* (e.g., oak). Condensed tannins are polymers formed by the condensation of flavans. Condensed tannins can be linear or branched molecules. Illustrative condensed tannins can include, but are not limited to *Acacia mearnsii* (e.g., wattle or mimosa bark extract), *Schinopsis* (e.g., quebracho wood extract), *Tsuga* (e.g., hemlock bark extract), *Rhus* (e.g., sumach extract), *Juglans* (e.g., walnut), *Carya illinoinensis* (e.g., pecan), and *Pinus* (e.g., Radiata pine, Maritime pine, bark extract species).

The condensed tannins include about 70 wt % to about 80 wt % active phenolic ingredients (the "tannin fraction") and the remaining ingredients (the "non-tannin fraction") can include, but are not limited to, carbohydrates, hydrocolloid gums, and amino and/or imino acid fractions. The condensed tannins can be used as recovered or extracted from the organic matter or the condensed tannins can be purified, e.g., to about 95 wt % or more active phenolic ingredients. Hydrolyzable tannins and condensed tannins can be extracted from the starting material, e.g., trees and/or shrubs, using well established processes. A more detailed discussion of tannins is discussed and described in the *Handbook of Adhesive Technology*, Second Edition, CRC Press, 2003, chapter 27, "Natural Phenolic Adhesives I: Tannin," and in *Monomers, Polymers and Composites from Renewable Resources*, Elsevier, 2008, chapter 8, "Tannins: Major Sources, Properties and Applications."

The condensed tannins can be classified or grouped into one of two main categories, namely, those containing a resorcinol unit and those containing a phloroglucinol unit. Illustrative tannins that include the resorcinol unit include, but are not limited to, black wattle tannins and quebracho tannins. The resorcinol unit can be represented by formula I below.

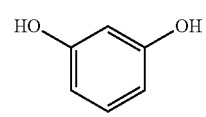

Formula I

The resorcinol group is shown within the box overlaying the unit structure of black wattle and quebracho tannins in Formula II below. For simplicity, the structure of black wattle and quebracho tannins is represented by their flavonoid unit structure.

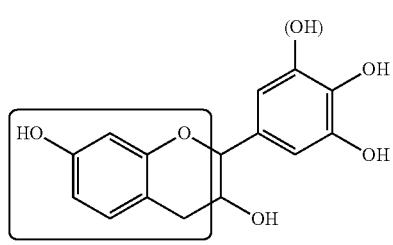

Formula II

Illustrative tannins that include the phloroglucinol unit include, but are not limited to, pecan tannins and pine tannins. The phloroglucinol unit can be represented by Formula III below.

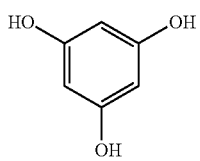

Formula III

The phloroglucinol unit is shown within the box overlaying the unit structure of pecan and pine tannins in Formula IV below. For simplicity, the structure of pecan and pine tannins is represented by their flavonoid unit structure.

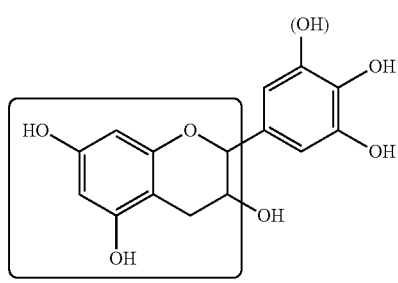

Formula IV

Phloroglucinol is known for higher reactivity than resorcinol. As such, tannins that include the phloroglucinol unit are more reactive than tannins that include the resorcinol unit.

If the adhesive composition includes a mixture of hydrolyzable tannins and condensed tannins any ratio with respect to one another can be used. For example, an adhesive composition that includes both hydrolyzable tannins and condensed tannins can have a concentration of condensed tannins ranging from about 1 wt % to about 99 wt %, based on the combined weight of the hydrolyzable tannins and the condensed tannins. In another example, an adhesive composition that includes both hydrolyzable tannins and condensed tannins can have a concentration of condensed tannins of about 50 wt % or more, about 55 wt % or more, about 60 wt % or more, about 70 wt % or more, about 75 wt % or more, about 80 wt % or more, about 85 wt % or more, about 90 wt % or more, about 95 wt % or more, or about 97 wt % or more.

The tannins can have an acidic pH. For example, the pH of the tannins can range from a low of about 3, about 3.5, or about 4 to a high of about 5, about 5.5, or about 6. The tannins can have resorcinol or phloroglucinol functional groups that can react with aldehydes under appropriate conditions. Suitable, commercially available tannins can include, but are not limited to, black wattle tannin and quebracho tannin. Other suitable tannins can include pine tannin and pecan tannin.

If the adhesive composition includes two or more different tannins, the two or more tannins can have resorcinol unit or a phloroglucinol unit. For example, the adhesive composition can include two different tannins that each include resorcinol units, e.g., quebracho tannins and black wattle tannins. In another example, the adhesive composition can include two different tannins, where a first tannin includes a resorcinol unit, e.g., black wattle tannin, and a second tannin includes a phloroglucinol unit, e.g., pine tannin. In another example, the adhesive composition can include two different tannins that each include phloroglucinol units, e.g., pine tannins and pecan tannins.

If the adhesive composition includes a mixture of two different tannins, the two tannins can be present in any ratio with respect to one another. For example, a adhesive composition that includes a first tannin and a second tannin, where the first and second tannins are different from one another, can have a concentration of the first tannin ranging from about 1 wt % to about 99 wt % and conversely about 99 wt % to about 1 wt % of the second tannin, based on the combined weight of the first and second tannins. In another example, the amount of the first tannin in an adhesive composition that includes a first and second tanning can range from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the combined weight of the first and second tannins. The adhesive composition can include any number of different tannins with the different tannins present in any desired amount.

Lignin is a polymeric substance that can include substituted aromatics found in plant and vegetable matter associated with cellulose and other plant constituents. Illustrative plant and vegetable matter can include, but is not limited to, straw, hemp, sisal, cotton stalk, wheat, bamboo, sabai grass, rice straw, banana leaves, paper mulberry (i.e., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, any combination thereof, or any mixture thereof. For example, the plant matter can be or include wood, for example hardwoods, softwoods, or a combination thereof. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow.

The lignin can be extracted, separated, or otherwise recovered from the wood, plant, and/or vegetable matter using any of a number of well established processes. For example, in the pulp and paper industry, lignin-containing materials such as wood, straw, corn stalks, bagasse, and other vegetable and plant tissues can be processed to recover the cellulose or pulp via the well known kraft or sulfate process or the well known sulfite process. The residual pulping liquors that include the lignin as a by-product can be a source of lignin. The chemical structure of lignin can vary and the variation can depend, at least in part, on the particular plant from which the lignin is recovered from, location the plant was grown, and/or on the particular method used in recovery or isolation of the lignin from the plant and/or vegetable matter. Lignin can include active groups, such as active hydrogens and/or phenolic hydroxyl groups through which crosslinking or bridging can be effected.

One process for recovering lignin can be or include the process commonly referred to as the organosolv process. The organosolve process uses an organic solvent to solubilize lignin and hemicelluloses. The organosolve process can include contacting lignocellulose material, e.g., wood chips or particles, with an aqueous organic solvent at a temperature from a low of about 130° C., about 140° C., or about 150° C. to a high of about 200° C., about 220° C., or about 230° C. The lignin can break down by hydrolytic cleavage of alpha arylether links into fragments that can be solubilized in the solvent system. Illustrative solvents can include, but are not limited to, acetone, methanol, ethanol, butanol, ethylene glycol, formic acid, acetic acid, any combination thereof, or any mixture thereof. The aqueous organic solvent can have a concentration of the solvent in water from a low of about 30 wt %, about 40 wt % or about 50 wt % to a high of about 70 wt %, about 80 wt %, or about 90 wt %.

Since the lignin separated from the plant can be chemically altered from that found in the plant, the term "lignin," can also refer to lignin products obtained upon separation from the cellulose or recovered from the plant matter. For example, in a sulfite pulping process, the lignocellulose material can be digested with a bisulfite or sulfite resulting in the at least partial sulfonation of the lignin. As such, the lignin can optionally be subjected to further cleavage and/or other modifications such as alkaline treatment or reaction with other constituents to decrease the sulfonate or sulfur content and/or increase the active groups. For example, the lignin can be processed such that it has a phenolic hydroxyl content from about 1.5 wt % to about 5 wt % and less than about 3 wt % sulfonate sulfur. In other methods of recovery or separation of lignin from wood, plant, or vegetable material, the lignin may not be sulfonated, but could be chemically altered somewhat in some other manner. For example, in residual pulping liquors obtained in sulfate or other alkaline pulping processes, the lignin can be present as an alkali metal salt dissolved in the alkaline, aqueous liquor and can generally include a sufficient phenolic hydroxyl content to require no further modification. However, the alkali or kraft lignin can be further reacted with other constituents to further increase the active groups. "Hydrolysis lignin" that can be recovered from the hydrolysis of lignocellulose materials in the manufacture of sugar, for example, can also be altered somewhat from that found in the plant. As such hydrolysis lignin can be further modified to solubilize the lignin as well as to increase the phenolic hydroxyl content. Also, the lignin products such as residual pulping liquor may be subjected to various treatments such as, for example, acid, alkaline or heat treatments or reacted with the other chemicals which may further alter somewhat the lignin constituents.

The residual pulping liquors or the lignin products produced in the separation or recovery of lignin from the plant matter can include lignin having various weight average molecular weights (Mw) ranging from about 300 to over 100,000. For example, the lignin can have a Mw from a low of about 500, about 1,000, about 5,000, about 10,000, about 15,000, or about 20,000 to a high of about 30,000, about 45,000, about 55,000, about 70,000, about 80,000, about 85,000, about 90,000, or about 95,000, with suitable ranges including the combination of any two values In another example, the lignin can have a Mw from a low of about 300, about 500, about 800, about 900, about 1,000, or about 1,100 to a high of about 1,300, about 1,500, about 1,900, about 2,300, about 2,500, about 2,700, about 3,000, about 3,300, about 3,500, about 3,700, about 4,000, about 4,300, about 4,500, about 4,700, or about 5,000, with suitable ranges including the combination of any two values. In another example, the lignin can have a Mw from a about 500 to about 30,000, about 1,000 to about 15,000, about 800 to about 6,000, about 2,000 to about 12,000, about 400 to about 10,000, or about 600 to about 8,000. In another example, the Mw of the lignin can be from about 600 to about 4,500, about 350 to about 1,100, about 750 to about 2,500, about 950 to about 3,100, about 1,500 to about 3,400, or about 1,800 to about 4,200.

The liquors from which the lignin can be recovered can also include one or more other constituents in addition to the lignin. For example, in the sulfite pulping process, the spent sulfite liquor can include lignosulfonates that can be present as salts of cations, such as magnesium, calcium, ammonium, sodium and/or other cations. The spent sulfite liquor solids can include about 40 wt % to about 65 wt % lignosulfonates with the remainder being carbohydrates and other organic and inorganic constituents dissolved in the liquor. Lignin products produced by other pulping processes can also include other materials such as carbohydrates, degradation products of carbohydrates, and resinous materials which are separated from the cellulosic materials with the lignin. It should be noted that it is not necessary to separate the lignin from the other constituents that can be present.

Suitable lignin material can include, but is not limited to, lignin in its native or natural state, i.e., non-modified or unaltered lignin, lignosulfonates, or any combination or mixture thereof. Suitable lignosulfonates can include, but are not limited to, ammonium lignosulfonate, sodium lignosulfonate, calcium lignosulfonate, magnesium lignosulfonate, or any combination or mixture thereof.

Suitable processes for isolating or otherwise separating lignin or lignin containing products form wood, plant, vegetable, or other lignin containing matter can include those discussed and described in U.S. Pat. Nos. 1,856,567; 2,525,433; 2,680,113; 2,690,973; 3,094,515; 3,158,520; 3,503,762; 3,585,104; 3,726,850; 3,769,272; 3,841,887; 4,100,016; 4,131,564; 4,184,845; 4,308,203; 4,355,996; 4,470,876; 4,740,591; and 4,764,596; U.S. Patent Application Publication Nos. 2011/0294991; and WO Publication Nos. WO1992/018557A1, WO1993/021260A2; WO1994/024192A1; WO2005/062800A2; WO2006/031 175 A1; and WO2011/150508. Commercially available lignin can include, but is not limited to, lignosulfonates available from Tembec (Canada).

Humic acid can be represented by the general formula:

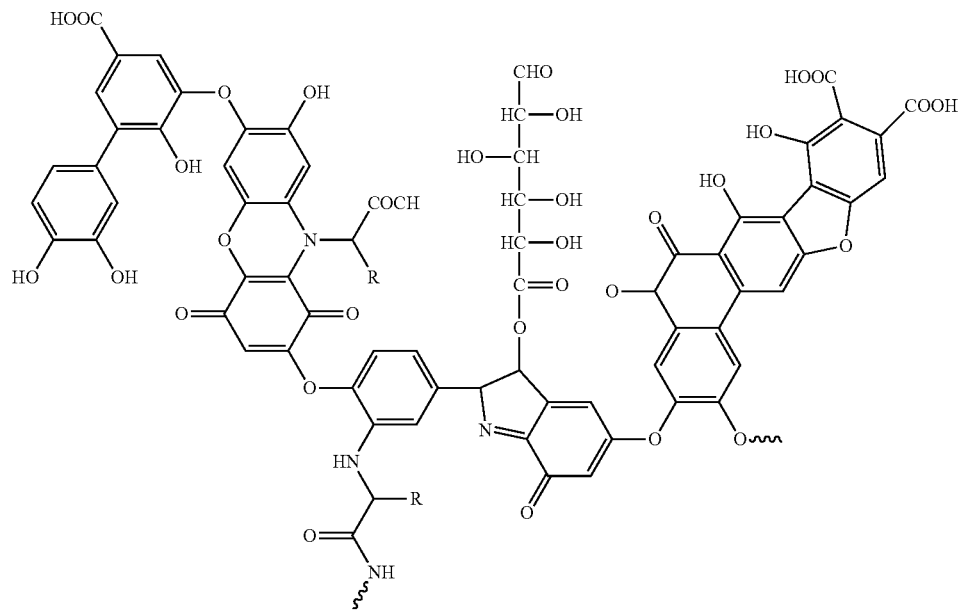

The aldehyde component of the phenolic-aldehyde resin can include, but is not limited to, unsubstituted aldehyde compounds and/or substituted aldehyde compounds. For example, suitable aldehyde compounds can be represented by the formula RCHO, wherein R is hydrogen or a hydrocarbon. Illustrative hydrocarbon radicals can include from 1 to about 8 carbon atoms. In another example, suitable aldehyde compounds can also include the so-called "masked" aldehydes or aldehyde equivalents, such as acetals or hemiacetals. Illustrative aldehyde compounds can include, but are not limited to, formaldehyde, paraformaldehyde, acetaldehyde, propionaldehyde, butyraldehyde, furfuraldehyde, benzaldehyde, any combination thereof, or any mixture thereof. One or more other aldehydes, such as glyoxal can be used in place of or in combination with formaldehyde and/or other aldehydes. In at least one example, the aldehyde compound can include formaldehyde, urea-formaldehyde concentrate (UFC), or a combination thereof. In another example, the aldehyde component can be or include 5-hydroxymethyl-1-aza-3,7-dioxabicyclo(3,3,0)octane. One commercially available source of 5-hydroxymethyl-1-aza-3,7-dioxabicyclo(3,3,0) octane can include LH 1000, available from Dow Chemical, which is a mixture of 5-hydroxymethyl-1-aza-3,7-dioxabicyclo(3,3,0)octane with water.

The aldehyde compound(s) used to produce the phenolic-aldehyde resin can be in any form, e.g., solid, liquid, and/or gas. Considering formaldehyde in particular, the formaldehyde can be or include paraform (solid, polymerized formaldehyde), formalin solutions (aqueous solutions of formaldehyde, sometimes with methanol, in 37 percent, 44 percent, or 50 percent formaldehyde concentrations), Urea-Formaldehyde Concentrate ("UFC"), and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3. Any of these forms, alone or in combination, can be suitable for use in preparing a phenol-formaldehyde resin.

The phenolic-aldehyde resin can be prepared under alkaline or acidic reaction conditions using a molar excess of the phenolic component relative to the aldehyde component. Suitable phenol-formaldehyde resins can be as discussed and described in U.S. Pat. Nos. 3,328,354; 3,389,125; 4,608,408; 5,670,571; 6,706,845; and 6,906,130; and U.S. Patent Application Publication No. 2008/0280787.

Specific phenolic-aldehyde resins can be or include: resorcinol-aldehyde, phenol-aldehyde, phenol-resorcinol-aldehyde, any combination thereof, or any mixture thereof. For example, the phenolic-aldehyde resin can be or include resorcinol-formaldehyde, phenol-formaldehyde, phenol-resorcinol-formaldehyde, any combination thereof, or any mixture thereof. The phenolic-aldehyde resin can be combined with the cure accelerant after the phenolic-aldehyde resin is synthesized or produced.

The phenolic-aldehyde resin can have a molar ratio of the aldehyde component (A) to the phenolic component ($P_c$) ranging from a low of about 0.2:1, about 0.4:1, or about 0.6:1 to a high of about 0.8:1, about 0.9:1, or about 1:1. The phenolic component ($P_c$) includes the sum of phenolic compounds present in the phenolic-aldehyde resin, e.g., phenol, resorcinol, tannin, any combination thereof, or any mixture thereof. For example, the phenolic-aldehyde resin can have a molar ratio of the aldehyde component (A) to the phenolic component ($P_c$) of about 0.3:1 to about 1.1:1, about 0.6:1 to about 2.3:1, about 0.8:1 to about 2.3:1, about 0.6:1 to about 2:1, about 0.6:1 to about 1.9:1, about 0.6:1 to about 1.7:1, about 0.6:1 to about 1.5:1, about 0.6:1 to about 1.3:1, about 0.5:1 to about 1.1:1, about 0.55:1 to about 0.8:1, about 0.6:1 to about 0.75:1, about 0.8:1 to about 1.1:1, about 0.9:1 to about 1.1:1, about 1:1 to about 1.1:1, about 0.8:1 to about 1.1:1, about 0.6:1 to about 0.7:1, or about 0.6:1 to about 1.1:1.

A suitable phenol-resorcinol-aldehyde resin can have a molar ratio of the phenol (P) to resorcinol (R) to aldehyde (A), i.e., P:R:A, of about 0.3-1.5:0.3-0.8:1, about 0.6-1.2:0.2-0.8:1, about 0.8-1:0.5-0.7:1, or about 1-1.2:0.35-0.5:1, or about 0.7-0.9:0.6-0.8:1, or about 0.9-1.1:0.45-0.65:1, about 0.7-1.2:0.3-0.8:1, about 1.3-1.5:0.45-0.6:1, about 0.7-1.5:0.3-0.8:1, or about 0.3-0.7:0.3-0.8:1. For example, the phenol-resorcinol-aldehyde resin can have a molar ratio of the phenol (P) to resorcinol (R) to aldehyde (A) of about 0.8:0.73:1, about 0.85:0.68:1, about 0.9:0.63:1, about 0.95:0.58:1, about 1:0.53:1, or about 1.13:0.44:1.

The phenol-resorcinol-aldehyde resin can have a concentration of phenol ranging from a low of about 40 wt %, about 42 wt %, about 44 wt %, about 46 wt %, or about 48 wt % to a high of about 54 wt %, about 56 wt %, about 58 wt %, about 60 wt %, or about 62 wt %, a resorcinol concentration ranging from a low of about 16 wt %, about 19 wt %, about 22 wt %, about 25 wt %, or about 28 wt % to a high of about 36 wt %, about 39 wt %, about 41 wt %, about 43 wt %, or about 45 wt %, and an aldehyde concentration ranging from a low of about 16 wt %, about 16.2 wt %, or about 16.4 wt % to a high of about 16.8 wt %, about 17 wt %, or about 17.2 wt %, based on the total solids weight of the phenol-resorcinol-aldehyde resin. For example, the phenol-resorcinol-aldehyde resin can have a concentration of phenol ranging from about 43.5 wt % to about 59.5 wt %, a concentration of resorcinol ranging from about 25 wt % to about 45 wt %, and a concentration of aldehyde ranging from about 16.6 wt % to about 17.1 wt %, based on the total solids weight of the phenol-resorcinol-aldehyde resin.

The phenol-resorcinol-aldehyde resin can have a concentration of phenol ranging from a low of about 22 wt %, about 23 wt %, about 24 wt %, about 25 wt %, or about 26 wt % to a high of about 30 wt %, about 31 wt %, about 32 wt %, about 33 wt %, or about 34 wt %, a resorcinol concentration ranging from a low of about 14 wt %, about 15 wt %, about 16 wt %, about 17 wt %, or about 18 wt % to a high of about 22 wt %, about 23 wt %, about 24 wt %, about 25 wt %, or about 26 wt %, an aldehyde concentration ranging from a low of about 18.2 wt %, about 18.4 wt %, or about 18.6 wt % to a high of about 18.9 wt %, about 19.1 wt %, or about 19.2 wt %, and a liquid concentration, e.g., water, ranging from a low of about 25 wt %, about 28 wt %, about 30 wt %, or about 32 wt % to a high of about 34 wt %, about 36 wt %, about 28 wt %, or about 40 wt %, based on the total weight of the phenol-resorcinol-aldehyde resin. For example, the phenol-resorcinol-aldehyde resin can have a concentration of phenol ranging from about 24 wt % to about 34 wt %, a concentration of resorcinol ranging from about 15 wt % to about 25 wt %, a concentration of aldehyde ranging from about 16.5 wt % to about 19.5 wt %, and a liquid concentration ranging from about 30 wt % to about 38 wt %, based on the total weight of the phenol-resorcinol-aldehyde resin.

The phenolic-aldehyde resin can have a weight average molecular weight ("Mw") (in Daltons) ranging from a low of about 700, about 1,000, about 1,500, about 2,000, about 3,000, or about 4,000 to a high of about 7,000, about 8,000, about 9,000, or about 10,000. For example, the weight average molecular weight of the phenolic-aldehyde resin can range from about 2,500 to about 6,500, about 3,500 to about 4,500, about 1,500 to about 8,500, about 3,500 to about 6,000, or about 3,500 to about 5,500. The Mw can be measured using gel permeation chromatography ("GPC"), also known as size exclusion chromatography (SEC). This technique utilizes an instrument containing columns packed with porous beads, an elution solvent, and detector in order to separate polymer molecules of different sizes, and is well known to those skilled in the art.

The phenolic-aldehyde resin can have a pH ranging from a low of about 7.5, about 8, about 8.5, or about 9 to a high of about 10, about 10.5, about 11, or about 11.5. For example, the adhesive composition can have a pH of about 8 to about 11, about 8.5 to about 10.5, or about 9 to about 10. The phenolic-aldehyde resin can have an alkalinity, i.e., contains a base, in the range of about 0.1% to about 15%, about 1% to about 12%, or about 2% to 8%, e.g., about 6%, based on the weight of the phenolic-aldehyde resin, when the base is sodium hydroxide. For example, the adhesive composition can have an alkalinity of about 0.5% to about 4%, about 1% to about 2%, about 0.1% to about 2.5%, about 1.5% to about 4.5%, or about 0.5% to about 2%, based on the weight of the phenolic-aldehyde resin when the base is sodium hydroxide. If a different base is used, the alkalinity content can be proportioned to be equivalent on a molar weight basis to the above noted range based on sodium hydroxide. For example, to attain the equivalent of an alkalinity of 6% sodium hydroxide, i.e., 6 grams of sodium hydroxide plus 94 grams of liquid resin (100 grams total), about 7.4 grams of potassium hydroxide in 92.6 grams of the resin solution would be required. As noted above, the base conveniently may be an alkali metal or alkaline earth metal compound such as a hydroxide, a carbonate, or an oxide.

The phenolic-aldehyde resin can have a viscosity ranging from a low of about 500 cP about 1,000 cP, or about 1,500 cP to a high of about 2,000 cP, about 5,000 cP, or about 10,000 cP, at a temperature of about 25° C. For example, the phenolic-aldehyde resin can have a viscosity ranging from about 500 cP to about 3,000 cP, about 700 cP to about 5,500 cP, about 1,500 cP to about 3,000 cP, or about 1,200 cP to about 2,700 cP, at a temperature of about 25° C.

The phenolic-aldehyde resin can have a solids concentration ranging from about 10 wt % to about 100 wt %. For example, the phenolic-aldehyde resin can have a solids concentration ranging from a low of about 20 wt %, about 30 wt %, about 40 wt % or about 50 wt % to a high of about 60 wt %, about 65 wt %, about 70 wt %, about 75 wt %, about 80 wt %, or about 85 wt %, based on the total weight of the phenolic-aldehyde resin. In another example, the phenolic-aldehyde resin can have a solids concentration of about 50 wt % to about 80 wt %, about 60 wt % to about 80 wt %, about 60 wt % to about 75 wt %, about 65 wt % to about 75 wt %.

The phenolic-aldehyde resin can be extended through the addition of one or more extenders. As used herein, the term "extender" refers to materials that can be added to the phenolic-aldehyde resin that occupy volume and also contribute to bonding properties or rheology properties of the adhesive composition. One example of a suitable extender can be or include agricultural residues such as shell flour and/or wood flour. Another extender can be or include one or more proteins. The protein can contribute to the crosslinking of the adhesive composition during at least partial cure thereof. Another example of a suitable extender can include urea. Illustrative extenders can include, but are not limited to, corn flour, soy flour, wheat flour, spray dried blood, or urea, any combination thereof, or any mixture thereof.

The phenolic-aldehyde resin, extended with an extender, can have an extender concentration ranging from about 1 wt % to about 50 wt %, based on the combined weight of the extender and the phenolic-aldehyde resin. In another example, the phenolic-aldehyde resin, extended with extender, can have a extender concentration ranging from a low of about 5 wt %, about 15 wt %, or about 25 wt % to a high of about 35 wt %, about 40 wt %, or about 45 wt %, based on the combined weight of the extender and the phenolic-aldehyde resin. Alternatively, or in addition to adding one or more extenders to the phenolic-aldehyde resin, the one or more extenders can similarly be combined with the phenolic-aldehyde resin during and/or after the cure accelerant and/or hardener are combined therewith to produce the adhesive composition.

The phenolic-aldehyde resin can include one or more fillers in addition to or in lieu of the one or more extenders. As used herein, the term "filler" refers to materials that can be added to the phenolic-aldehyde resin that occupy volume but do not contribute or do not substantially contribute to bonding properties of the adhesive composition. Suitable fillers can be or include, but are not limited to, ground, crushed, pulverized, other otherwise reduced into particulate form nut shells, seed shells, fruit pits, animal bones, clay, e.g., attapulgite clay, ground corn cobs, any combination thereof, or any mixture thereof. Other suitable fillers can include, but are not limited to, inorganic oxides, e.g., silica and/or alumina, glass spheres or particulates, and the like.

Illustrative nut shells can include, but are not limited to, walnut shells, pecan shells, almond shells, ivory nut shells, brazil nut shells, ground nut (peanut) shells, pine nut shells, cashew nut shells, sunflower seed shells, Filbert nut (hazel nut) shells, macadamia nut shells, soy nut shells, pistachio nut shells, pumpkin seed shells, or the like, any combination thereof, or any mixture thereof. Illustrative seed shells (including fruit pits), can include, but are not limited to, the seed shells of fruit, e.g., plum, peach, cherry, apricot, olive, mango, jackfruit, guava, custard apples, pomegranates, and watermelon, ground or crushed seed shells of other plants such as maize (e.g., corn cobs or corn kernels), wheat, rice, jowar, or the like, any combination thereof, or any mixture thereof. More particular examples of suitable fillers can include, but are not limited to, wheat shell, corn husk, peanut shell, any combination thereof, or any mixture thereof. For example, the nut shells and/or seed shells can be ground or powdered, e.g., flour form. In one example, suitable flours derived from nut shells can include, but are not limited to, walnut shell flour, pecan shell flour, almond shell flour, any combination thereof, or any mixture thereof. Illustrative flour derived from the seed shells of fruits can include, but are not limited to, apricot pit shell flour, peach pit shell flour, prune pit shell flour, any combination thereof, or any mixture thereof.

The phenolic-aldehyde resin can have a filler concentration ranging from about 1 wt % to about 50 wt %, based on the combined weight of the filler and the phenolic-aldehyde resin. In another example, the phenolic-aldehyde resin can have a filler concentration ranging from a low of about 5 wt %, about 15 wt %, or about 25 wt % to a high of about 35 wt %, about 40 wt %, or about 45 wt %, based on the combined weight of the filler and the phenolic-aldehyde resin. The optional filler can be added to the resin by mixing, blending, or any other process. Alternatively, or in addition to adding one or more fillers to the phenolic-aldehyde resin, the one or more fillers can similarly be combined with the phenolic-aldehyde resin during and/or after the cure accelerant and/or hardener are combined therewith to produce the adhesive composition.

The hardener that can be combined with the phenolic-aldehyde resin and cure accelerant can include any one or combination of suitable hardeners. As noted above, the hardener includes one or more alkylene group donors. Suitable hardeners can be or include, but are not limited to, furfural, formaldehyde, paraformaldehyde, hexamethylenetetramine, 5-hydroxymethyl-1-aza-3,7-dioxabicyclo(3,3,0)octane, dimethylol urea, oxazolidine, glyoxal, glutaraldehyde, other aliphatic mono and di-aldehydes, any combination thereof, or any mixture thereof.

Suitable bifunctional or difunctional aldehydes having two aldehyde (—CHO) functional groups can be represented by Formula V below:

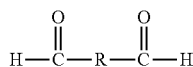

Formula V where R is a divalent aliphatic, cycloaliphatic, aromatic, or heterocyclic group having from 1 to 12 carbon atoms. Illustrative multi-functional aldehydes can include, but are not limited to, malonaldehyde, succinaldehyde, glutaraldehyde, 2-hydroxyglutaraldehyde, β-methylglutaraldehyde, adipaldehyde, pimelaldehyde, suberaldehyde, malealdehyde, fumaraldehyde, sebacaldehyde, phthalaldehyde, isophthalaldehyde, terephthalaldehyde, ring-substituted aromatic aldehydes, any combination thereof, or any mixture thereof. A suitable bifunctional or difunctional aldehyde that includes two carbon atoms and has two aldehyde functional groups is glyoxal.

The hardener can be a solid and/or liquid. The hardener can be combined with water and/or one or more other liquid mediums to provide a dispersion, solution, slurry, or the like. As such, the hardener can be combined with the phenolic-aldehyde resin, the cure accelerator, or the mixture of the phenolic-aldehyde resin and the cure accelerator in the form of a solid, e.g., particulates, a liquid, and/or a liquid/solid mixture, e.g., a slurry. The hardener can also be combined with one or more rheology modifiers, e.g., attapulgite and/or bentonite clays, suspending agents, e.g., surfactants, pH control agents, e.g., water soluble organic acids which do not form insoluble salts in hard waters, any combination thereof, or any mixture thereof.

Any one or more liquid mediums in lieu of or addition to water can be combined with the hardener. For example, the hardener can be combined with one or more ethers, one or more esters, one or more mono alcohols, one or more polyols, any combination thereof, or any mixture thereof to produce a solution, dispersion, slurry, or other mixture. Illustrative mono alcohols can include, but are not limited to, methanol, ethanol, propanol, butanol, any combination thereof, or any mixture thereof. Illustrative polyols that can be combined with the hardener can include, but are not limited to, 1,4-cyclohexanediol, catechol, cyanuic acid, diethanolamine, pryogallol, butanediol, 1,6-hexane diol, 1,2,6 hexanetriol, 1,3 butanediol, 1,4-cyclohexane dimethanol, 2,2,4 trimethylpentanediol, alkoxylated bisphenol A, Bis[N,N di beta-hydroxyethyl)]adipamid, bisphenol A, bisphenol A diglycidyl ether, bisphenol F diglycidyl ether, cyclohexanedimethanol, dibromoneopentyl glycol, polyglycerol, diethylene glycol, dipropylene glycol, glycol ethers, ethoxylated DETA, ethylene glycol, glycerine, neopentyl glycol, pentaerythritol, low molecular weight (e.g., a weight average molecular weight of about 750 or less) polyethylene glycol and/or polypropylene glycol, propane 1,3 diol, propylene glycol, polyethylene oxide (hydroxy terminated), sorbitol, tartaric acid, tetrabromoalkoxylate bisphenol A, tetrabromobisphenol A, tetrabromobisphenol diethoxy ether, triethanolamine, triethylene glycol, trimethylolethane, ethyl diethanolamine, methyl diethanolamine, one or more carbohydrates, polyvinyl alcohols, hydroxyethylcellulose, resorcinol, pyrogallol, glycollated ureas, lignin, trimethylolpropane, tripropylene glycol, any combination thereof, or any mixture thereof. The one or more carbohydrates can include one or more monosaccharides, disaccharides, oligosaccharides, polysaccharides, or any combinations thereof. The one or more carbohydrates can include one or more aldose sugars. The monosaccharide can be or include D-Glucose (dextrose monohydrate), L-Glucose, or a combination thereof. Other carbohydrate aldose sugars can include, but are not limited to, glyceraldehyde, erythrose, threose, ribose, deoxyribose, arabinose, xylose, lyxose, allose, altrose, gulose, mannose, idose, galactose, talose, and any combination thereof. The carbohydrate can also be or include one or more reduced or modified starches such as dextrin, maltodextrin, and oxidized maltodextrins.

Not wishing to be bound by theory, it is believed that combining the hardener with one or more polyols can reduce formaldehyde emission from the adhesive composition. For example, the polyol can combine with free formaldehyde and/or at the end of formaldehyde polymer chains, e.g., paraformaldehyde, and reduce or prevent the emission of formaldehyde from the hardener and/or the adhesive composition containing the hardener. Still not wishing to be bound by theory, it is also believed that combining the hardener with one or more polyols can produce an adhesive composition that wets a wood substrate more efficiently as compared to a comparative adhesive composition that does not include the one or more polyols. When the adhesive composition wets the wood more efficiently, the adhesive composition can better penetrate the wood substrate and/or produce composite products having improved bonding characteristics, e.g., bond strength.

If the hardener is combined with one or more liquid mediums, any ratio with respect to the hardener and the liquid medium can be used. For example, the mixture of the hardener and a liquid medium can have a concentration of the hardener ranging from about 1 wt % to about 99 wt %, based on the combined weight of the hardener and the liquid medium. In another example, the mixture of the hardener and the liquid medium can have a concentration of hardener of about 5 wt %, about 10 wt %, about 20 wt %, about 30 wt %, about 40 wt %, about 50 wt %, about 60 wt %, about 70 wt %, about 80 wt %, about 85 wt %, about 90 wt %, or about 95 wt %, based on the combined weight of the hardener and liquid medium.

If the hardener is combined with two or more liquid mediums, e.g., a first liquid medium and a second liquid medium, the amount of the first liquid medium and the second liquid medium can widely vary with respect to one another. For example, if the hardener is combined with two liquid mediums, the amount of the first liquid medium can range from about 1 wt % to about 99 wt %, based on the combined weight of the first and second liquid mediums. In another example, the amount of the first liquid medium can be about 10 wt % or more, about 20 wt % or more, about 30 wt % or more, about 40 wt % or more, about 50 wt % or more, about 60 wt % or more, about 70 wt % or more, about 80 wt % or more, about 90 wt % or more, or about 95 wt % or more, based on the combined weight of the first and second liquid mediums.

Any one or more components of the adhesive composition, e.g., the phenolic-aldehyde resin, cure accelerant, and/or the hardener can be encapsulated. For example, the hardener can be contained within a plurality of capsules or other enclosed shells or containers to inhibit or prevent direct contact with the phenol-formaldehyde resin and cure accelerant. The capsules can break, burst, fracture, or otherwise permit the component contained therein to escape at a desired time or after a desired time. For example, pressure and/or heat applied to a plurality of particulates to which the adhesive composition has been applied can cause the capsules to fracture, releasing the compound(s) contained within the capsules and allowing the crosslinking reactions between the phenolic-aldehyde and hardener.

As noted above, adhesive composition can have a concentration of the cure accelerant ranging from a low of about 0.1 wt % to a high about 0.8 wt %, based on the combined solids weight of the phenolic-aldehyde resin and the cure accelerant. If the cure accelerant is contained within a plurality of capsules or other enclosed shells or containers, however, the amount of cure accelerant can be substantially increased. For example, the amount of cure accelerant can range from about 0.1 wt % to about 3 wt % or more, based on the combined solids weight of the phenolic-aldehyde resin and the cure accelerant. Increasing the amount of cure accelerant in the adhesive composition can further reduce the time required to cure the adhesive composition. As such, the amount of cure accelerant in the adhesive composition can range from a low of about 0.1 wt %, about 0.3 wt %, about 0.5 wt %, about 0.7 wt %, about 1 wt %, about 1.2 wt %, or about 1.5 wt % to a high of about 2 wt %, about 2.3 wt %, about 2.5 wt %, about 2.7 wt %, about 3 wt %, about 3.3 wt %, or about 3.5 wt %, based on the combined solids weight of the phenolic-aldehyde resin and the cure accelerant The capsules, if used to encapsulate one or more components of the adhesive composition, can be micro-capsules. Micro-capsules can have an average cross-sectional size ranging from about 0.25 μm to about 1,000 μm. For example, the micro-capsules can have an average cross-sectional size ranging from a low of about 1 μm, about 5 μm, or about 10 μm to a high of about 100 μm, about 200 μm, about 400 μm, or about 600 μm. The capsules, if used to encapsulate one or more components of the adhesive composition, can be macro-capsules. Macro-capsules can have an average cross-sectional size ranging from about 1,000 μm to about 10,000 μm. For example, the macro-capsules can have an average cross-sectional size ranging from a low of about 1,000 μm, about 1,500 μm, or about 2,000 μm to a high of about 5,000 μm, about 7,000 μm, or about 9,000 μm. Techniques for the encapsulation of various compounds are discussed and described in U.S. Pat. Nos. 4,536,524; 5,435,376; 5,532,293; 5,709,340; 5,911,923; 5,919,407; 5,919,557; 6,004,417; 6,084,010; 6,592,990; 6,703,127; 6,835,334; 7,286,279; 7,300,530; 7,309,500; 7,323,039; 7,344,705; 7,376,344; 7,550,200.

Preparation of the capsules can include, but is not limited to, interfacial polymerization, phase separation processes, or coacervation processes. Encapsulation methods can also include reaction in an aqueous medium conducted in the presence of negatively-charged, carboxyl-substituted, linear aliphatic hydrocarbon polyelectrolyte material dissolved in the aqueous medium, or reaction in the presence of gum arabic, or reaction in the presence of an anionic polyelectrolyte and an ammonium salt of an acid.

Numerous patents discuss and describe the various techniques that can be used to encapsulate various compounds using various encapsulation materials. For example, U.S. Pat. No. 7,323,039 discloses emulsion methods for preparing core/shell microspheres using an in-water drying method, after which the microspheres are recovered from the emulsion by centrifuging, filtering, or screening. U.S. Pat. No. 7,286,279 discloses microencapsulation processes and compositions prepared in a solution comprising a polymer precursor such as a monomer, chain extender, or oligomer; emulsifying the precursor into a fluorinated solvent; and forming microparticles by hardening the emulsion by polymerization/crosslinking the precursor, including interfacial and/or in-situ polymerization/crosslinking. U.S. Pat. No. 7,376,344 discloses heat sensitive encapsulation. U.S. Pat. No. 7,344,705 discloses preparation of low density microspheres using a heat expansion process, where the microspheres include biocompatible synthetic polymers or copolymers. U.S. Pat. Nos. 7,309,500 and 7,368,130 disclose methods for forming micro-particles, where droplets of chitosan, gelatin, hydrophilic polymers such as polyvinyl alcohol, proteins, peptides, or other materials can be charged in an immiscible solvent to prevent them from coalescing before hardening, optionally treating the gelated micro-particles with a crosslinking agent to modify their mechanical properties. U.S. Pat. No. 7,374,782 discloses the production of microspheres of a macromolecule such as protein mixed with a water-soluble polymer under conditions which permit the water-soluble polymer to remove water from the protein in contact with a hydrophobic surface. U.S. Pat. No. 7,297,404 discloses coacervative microencapsulation, which is followed by phase separation and cross-linking. U.S. Pat. No. 7,375,070 discloses microencapsulated particles with outer walls including water-soluble polymers or polymer mixtures as well as enzymes. U.S. Pat. No. 7,294,678 discloses a polynitrile oxide or polynitrile oxide dispersion microencapsulated within a barrier material coating prior to compounding it into a rubber mixture to prevent premature reaction with rubber particles. U.S. Pat. No. 7,368,613 discloses microencapsulation using capsule materials made of wax-like plastics materials such as polyvinyl alcohol, polyurethane-like substances, or soft gelatin. U.S. Pat. Nos. 4,889,877; 4,936,916; and 5,741,592 are also related to microencapsulation.

Suitable capsule or shell materials can be or include any one or more of a number of different materials. For example, the capsule or shell material can include natural polymers, synthetic polymers, synthetic elastomers, and the like. Illustrative natural polymers can include, but are not limited to, carboxymethylcellulose, zein, cellulose acetate phthalate, nitrocellulose, ethylcellulose, propylhydroxycellulose, gelatin, shellac, gum Arabic, succinylated gelatin, starch, paraffin waxes, bark, proteins, methylcellulose, kraft lignin, arabinogalactan, natural rubber, any combination thereof, or any mixture thereof. Illustrative synthetic polymers can include, but are not limited to, polyvinyl alcohol, polyvinyidene chloride, polyethylene, polyvinyl chloride, polypropylene, polyacrylate, polystyrene, polyacrylonitrile, polyacrylamide, chlorinated polyethylene, polyether, acetal copolymer, polyester, polyurethane, polyamide, polyvinylpyrrolidone, polyurea, poly(p-xylylene), epoxy, polymethyl methacrylate, ethylene-vinyl, polyhydroxyethyl, acetate copolymer, methacrylate, polyvinyl acetate, any combination thereof, or any mixture thereof. Illustrative synthetic elastomers can include, but are not limited to, polybutadiene, acrylonitrile, polyisoprene, nitrile, neoprene, butyl rubber, chloroprene, polysiloxane, styrene-butadiene rubber, hydrin rubber, silicone rubber, ethylene-propylene-diene terpolymers, any combination thereof, or any mixture thereof.

The adhesive composition can be used to make, produce, or otherwise prepare a variety of products. For example, the adhesive composition can be applied to a plurality of substrates, which can be formed into a desired shape before or after application of the adhesive composition, and then the adhesive composition can be at least partially cured to produce a product. In another example, the adhesive composition can be used to secure two or more bodies or structures to one another, e.g., a joint between two boards.

Illustrative composite wood products or articles produced using the adhesive compositions can include, but are not limited to, particleboard, fiberboard such as medium density fiberboard ("MDF") and/or high density fiberboard ("HDF"), plywood such as hardwood plywood and/or softwood plywood, oriented strand board ("OSB"), laminated veneer lumber ("LVL"), glulam products, finger jointed boards, lignocellulose based I-beams, and the like.

The substrate material can include, but are not limited to, organic based substrates, inorganic based substrates, or a combination thereof. Suitable organic based substrates can include but are not limited to, lignocellulose material (substrates that include both cellulose and lignin), straw, hemp, sisal, cotton stalk, wheat, bamboo, sabai grass, rice straw, banana leaves, paper mulberry (i.e., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, animal fibers (e.g., wool, hair), recycled paper products (e.g., newspapers, cardboard, cereal boxes, and magazines), any combination thereof, or any mixture thereof. For example, organic based substrates can be or include wood, for example hardwoods, softwoods, or a combination thereof. Illustrative types of wood can include, but are not limited to, Alaskan Yellow Cedar, Alder, Ash, Aspen, Basswood, Beech, Birch, Cedar, Cherry, Cottonwood, Cypress, Douglas Fir, Elm, Fir, Gum, Hackberry, Hickory, Maple, Oak, Pecan, Pine, e.g., Southern Yellow Pine, Lodgepole Pine, Poplar, Redwood, Sassafras, Spruce, Sycamore, Walnut, Willow, and Sweetgum. Inorganic based fibers can include, but are not limited to plastic fibers (e.g., polypropylene fibers, polyethylene fibers, polyvinyl chloride fibers, polyester fibers, polyamide fibers, polyacrylonitrile fibers), glass fibers, glass wool, mineral fibers, mineral wool, synthetic inorganic fibers (e.g., aramid fibers, carbon fibers), ceramic fibers, and any combination thereof. Organic and inorganic based fibers can be combined to provide the fibers.

The starting material, from which the substrates can be derived from, can be reduced to the appropriate size, if desired for a particular product being produced, by various processes such as hogging, grinding, hammer milling, tearing, shredding, and/or flaking. Suitable forms of the substrates can include, but are not limited to, chips, fibers, shavings, sawdust or dust, or the like. The substrates can have a length ranging from a low of about 0.05 mm, about 0.1 mm, about 0.2 mm to a high of about 1 mm, about 5 mm, about 10 mm, about 20 mm, about 30 mm, about 40 mm, about 50 mm, or about 100 mm. For other products such as finger jointed wood, the substrates can be boards of wood having any desired length, e.g., from a few centimeters to 1, 2, 3, or 4 meters, for example. Other substrates can include, but are not limited to, dimensional lumber that can be jointed together via the adhesive composition. Illustrative dimensional lumber can include boards, e.g., a 2"×4" board, flange and web members that can be bonded together to form I-beams, and the like.

In one or more embodiments, the composite products made with the adhesive composition can be structural products. The structural products can be formed by bonding a plurality of lignocellulose substrates together with one or more adhesives to provide a structural product for use as a structural member or support in the construction of floors, walls, and roofs. As such, the adhesive compositions can be used to make structural products that satisfy any one or more of the following standardized tests: ASTM D2559-12a, Standard Specification for Adhesives for bonded Structural Wood Products for Use under Exterior Exposure Conditions, ASTM International; ASTM D3737-12, Standard Practice for Establishing Allowable Properties for Structural Glued Laminated Timber (Glulam), ASTM International; ASTM D5456-12, Standard Specification for Evaluation of Structural Composite Lumber Products, ASTM International; ASTM D5764-97a (2007), Standard Test Method for Evaluating Dowel-Bearing Strength of Wood and Wood-based Products, ASTM International; ASTM D6815-09, Standard Specification for Evaluation of Duration of Load and Creep Effects of Wood and Wood-Based Products, ASTM International; ASTM D7247-07ae1 Standard Test Method for Evaluating the Shear Strength of Adhesive Bonds in Laminated Wood Products of Elevated temperatures, ASTM International; ASTM D3535-07a Standard Test Method for Resistance to creep Under Static Loading for Structural Wood Laminating Adhesives Used Under Exterior Exposure Conditions; CSA O112.9 (2010) Evaluation of Adhesives for Structural Wood Products (Exterior Exposure); and/or CSA O112.10 (2008) Evaluation of Adhesives for Structural Wood Products (Limited Moisture Exposure).

The lignocellulose substrates can be contacted with the adhesive composition by spraying, coating, mixing, brushing, falling film or curtain coater, dipping, soaking, extrusion, or the like. The lignocellulose substrates contacted with the adhesive composition can be referred to as a "furnish," i.e., the mixture of the substrates and the adhesive composition. The lignocellulose substrates contacted with the adhesive composition can be formed into a desired shape before, during, and/or after at least partial curing of the adhesive composition. Depending on the particular product, the lignocellulose substrates contacted with the adhesive composition can be pressed before, during, and/or after the adhesive composition is at least partially cured. For example, the lignocellulose substrates contacted with the adhesive composition can be consolidated or otherwise formed into a desired shape, if desired pressed to a particular density and thickness, and heated to at least partially cure the adhesive composition.

The adhesive composition used to make composite product e.g., oriented strand board or laminated veneer boards, I-beams, glulam beams, finger joints, or the like, can be applied or otherwise contacted with the substrate and the adhesive composition can be cured at a temperature of about 25° C., with no intentionally applied energy, e.g., no intentionally added heat or electromagnetic radiation, in a time of about 24 hours or less, about 20 hours or less, or about 16 hours or less. Alternatively, the adhesive composition containing the cure accelerant and the phenolic-aldehyde resin can be used to produce a composite product in which the adhesive composition can be cured at an elevated temperature, e.g., from about 50° C. to about 250° C. for a time ranging from a low of about 2 minutes, about 5 minutes, or about 10 minutes to a high of about 15 minutes, about 20 minutes, about 30 minutes, about 1 hour, about 2 hours, or about 3 hours.

The pressure applied to the substrate/adhesive composition can depend, at least in part, on the particular product. For example, the amount of pressure applied in a particleboard production process can range from about 0.1 MPa to about 5 MPa or from about 0.5 MPa to about 2 MPa. In another example, the amount of pressure applied in a MDF production process can range from about 0.5 MPa to about 7 MPa or from about 1 MPa to about 6 MPa. The temperature the product can be heated to produce an at least partially cured product can range from a low of about 25° C., about 40° C., about 60° C., about 80° C., about 100° C., about 125° C., about 150° C., or about 170° C. to a high of about 180° C., about 200° C., about 220° C., or about 250° C. In one or more embodiments, if the substrate/adhesive composition is heated to a temperature of about 120° or more, the adhesive composition at the core or center of the product can be heated to a temperature ranging from a low of about 120° C., about 130° C., about 140° C., about 150° C., or about 155° C. to a high of about 160° C., about 170° C., about 180° C., about 190° C., about 195° C., or about 199° C. In one or more embodiments, the adhesive composition can be cured without heating. Said another way, the adhesive composition can be cured at ambient conditions.

The length of time the pressure can be applied can range from a low of about 15 second, about 30 seconds, about 1 minute, about 3 minutes, about 5 minutes, or about 7 minutes to a high of about 10 minutes, about 15 minutes, about 20 minutes, about 30 minutes, about 1 hour, about 12 hours, about 24 hours, about 36 hours, about 48 hours, or more, which can depend, at least in part, on the particular product and/or the particular dimensions, e.g., thickness of the product, and/or the temperature the product is heated to. For example, the length of time the pressure and/or heat can be applied to the furnish can range from about 30 seconds to about 10 minutes, about 30 seconds to about 2 minutes, about 1 minute to about 3 minutes, about 1.5 minutes to about 4 minutes, about 45 seconds to about 3.5 minutes, or about 5 minutes to about 10 minutes.

Impurities such as metal ions, e.g., sodium, iron, potassium, and the like, can be introduced to the adhesive composition via several possible sources, which can include, but are not limited to, the particular type of accelerant, cross-linker, catalyst used in the manufacture of the phenolic-aldehyde resin, filler material, extender material, and/or other additives or modifiers that can potentially be added to the adhesive composition. The metal atoms or ions can also be introduced as a base and/or acid compound added during synthesis of the phenolic-aldehyde resin such as one or more alkali and/or alkaline earth metal hydroxides and/or carbonates. Illustrative hydroxides can include, but are not limited to, sodium hydroxide, potassium hydroxide, lithium hydroxide, cesium hydroxide, barium hydroxide, calcium hydroxide, magnesium hydroxide, aluminum hydroxide, any combination thereof, or any mixture thereof. Illustrative carbonates can include, but are not limited to, sodium carbonate, sodium bicarbonate, and potassium carbonate. The concentration of these metal atoms and/or metal ions can be maintained below a desired amount. For example, the adhesive composition can have a metal atom or ion concentration low enough to permit use of the adhesive composition in the production of composite products that can be cured by directing radio waves and/or microwaves toward a mixture of the substrate material(s) and adhesive composition without causing any electric arcing.

Little or no electrical arcing can be present when curing the adhesive composition via radio wave and/or microwave heating. In at least one specific embodiment, the adhesive composition can be cured to produce a composite product without any electrical arcing or with a reduced amount of electrical arcing as compared to a comparative adhesive composition, where the adhesive composition is free from the cure accelerant.

The total amount of metal or metal ion in the adhesive composition can be less than about 3.5 wt %, less than about 3.3 wt %, less than about 3 wt %, less than about 2.7 wt %, less than bout 2.5 wt %, less than about 2.3 wt %, less than about 2 wt %, less than about 1.7 wt %, less than about 1.5 wt %, less than about 1.3 wt %, or less than about 1 wt %, based on the total solids weight of the adhesive composition. In another example, the adhesive composition can be substantially free from any metal atoms or ions. As used herein, the term "substantially free from any metal atoms or ions" means the adhesive composition contains less than about 1 wt %, less than about 0.5 wt %, less than about 0.1 wt %, less than about 0.05 wt %, less than about 0.01 wt %, less than about 0.005 wt %, less than about 0.001 wt %, or less than about 0.0005 wt % of any metal atoms or metal ions, based on a total solids weight of the adhesive composition.

If the adhesive composition is used to form substrate to substrate joints, e.g., the adhesive bead or "glue line" between a web material and the two perpendicular sides of an I-beam, any type of radio frequency heating method can be used to cure the adhesive composition. For example, perpendicular heating, parallel heating, and/or stray field heating can be used to cure the adhesive composition to form a composite product.

The adhesive composition can also exhibit a reduced level or degree of sagging relative to a comparative resin that is free from the cure accelerant. Sag refers to the flow of an adhesive down a vertical surface under the force of gravity. The greater the distance an adhesive flows down a vertical surface over a give period of time, the greater the sag. The sag for two or more adhesives can be compared by applying the same amount of adhesive to a surface that is or can be oriented vertically and measure the distance the adhesive travels down the vertically oriented surface over a set time.

One method for measuring or estimating the sag of the adhesive composition can be as follows. A 15 inch surfaced (planed) 1 inch×6 inch red oak board equilibrated at a temperature of about 25° C. and a humidity of about 65% RH (11.7% equilibrium moisture content) can be prepared. A straight line can be drawn along the length of the board about 1 inch from the edge on the 6 inch wide surface. About 20 grams of the adhesive composition, i.e., the phenolic-aldehyde resin, cure accelerant, and hardener, can be prepared. After about 2 minutes a 5 mL syringe having a 0.1 mL resolution can be used to withdraw adhesive. About 6 to 8 drops of the adhesive, about 0.2 mL each, can be applied along the line on the board, with the bottom edge of the drops touching the top edge of the line drawn on the board. The surface of the board the adhesive is applied to can be oriented horizontally when the adhesive is applied. At a time of about 1 minute after applying the adhesive, the board can be re-oriented so that the surface on which the resin was applied is vertically oriented. The adhesive can be allowed to run or flow down the side of the board for about 5 minutes and the board can be re-oriented so that the surface having the resin is horizontally oriented. The length each adhesive drop ran down the side of the board can then be measured. The measured distance is referred to as the sag length for that particular drop of resin. An average length for the 6 to 8 resin samples can be calculated, with the average length representing the sag for the measured adhesive.

Depending on the particular composite product being produced, the amount of adhesive composition contacted with the substrates can widely vary. For example, if the adhesive composition is used to form or provide a substrate to substrate joint, the amount of adhesive relative to the substrates can range from a low of about 26 pounds (lbs), about 28 lbs, or about 30 lbs to a high of about 33 lbs, about 35 lbs, or about 37 lbs per thousand feet of a single glue line, based on the dry weight of the two substrates joined together. In at least one specific example, the amount of adhesive composition relative to the substrates can range from a low of about 58 lbs, about 60 lbs, or about 62 lbs to a high of about 68 lbs, about 70 lbs, or about 72 lbs per thousand feet of a single glue line, based on the dry weight of the two substrates joined together.

In another example, the adhesive composition can be applied as a double glue line with equal or unequal amounts of the adhesive composition applied in each glue line. In at least one other specific example, the amount of adhesive relative to the substrates can range from a low of about 65 lbs, about 70 lbs, or about 75 lbs to a high of about 85 lbs, about 90 lbs, about 95 lbs, about 100 lbs, about 105 lbs, about 110 lbs, about 120 lbs, about 130 lbs, or more per thousand feet of a single glue line, based on the dry weight of the two substrates joined together.

In another example, if the adhesive composition is used to at least partially coat a plurality of particulates, chips, flakes, and the like to produce composite products such as oriented strand board or particle board, the amount of the adhesive composition applied to the substrates can range from a low of about 1 wt %, about 2 wt %, about 3 wt %, about 4 wt %, about 5 wt % or about 6 wt % to a high of about 10 wt %, about 12 wt %, about 15 wt %, or about 20 wt %, based on the dry a weight of the lignocellulose substrates. For example, a composite product of the lignocellulose substrates can contain from about 5 wt % to about 15 wt %, about 8 wt % to about 14 wt %, about 10 wt % to about 12 wt %, or about 7 wt % to about 10 wt % adhesive composition, based on the dry weight of the lignocellulose substrates. In another example, a composite product of the lignocellulose substrates can contain from about 1 wt % to about 4 wt %, about 1.5 wt % to about 5 wt %, about 2 wt % to about 4 wt %, about 2 wt % to about 6 wt %, or about 0.5 wt % to about 5.5 wt % adhesive composition, based on the dry weight of the lignocellulose substrates.

The starting material, from which the lignocellulose substrates can be derived from, can also be formed into the appropriate size or dimensions by skiving, cutting, slicing, sawing, or otherwise removing a thin layer or sheet from a source of lignocellulose material, e.g., a wood log, to produce a veneer. One or more composite products can be produced from two or more veneer. For example, composite products produced with veneer, in finished form, can include those products typically referred to as laminated veneer lumber ("LVL"), laminated beams, and/or plywood. As such, suitable lignocellulose substrates can include, but are not limited to, wood chips, wood fibers, wood flakes, wood strands, wood wafers, wood shavings, wood particles, wood veneer, any combination thereof, or any mixture thereof.

Referring to veneer products in more detail, depending, at least in part, on the particular product that can incorporate the veneer(s), the veneers can have any suitable shape, e.g., rectangular, circular, or any other geometrical shape. The veneers can be rectangular, and can have a width ranging from a low of about 1 cm, about 5 cm, about 10 cm, about 15 cm, about 20 cm, or about 25 cm to a high of about 0.6 m, about 0.9 m, about 1.2 m, about 1.8 m, or about 2.4 m. The veneers can have a length ranging from a low of about 0.3 m, about 0.6 m, about 0.9 m, about 1.2 m, or about 1.8 m to a high of about 2.4 m, or about 3 m, about 3.6 m, about 4.3 m, about 4.9 m, about 5.5 m, about 6.1 m, about 6.7 m, about 7.3 m, or about 7.9 m. For example, in a typical veneer product such as plywood, the veneers can have a width of about 1.2 m and a length of about 2.4 m. The veneers can have a thickness ranging from a low of about 0.8 mm, about 0.9 mm, about 1 mm, about 1.1 mm or about 1.2 mm to a high of about 3 mm, about 4 mm, about 5 mm, about 6 mm, about 7 mm, about 8 mm, about 9 mm, or about 10 mm.

Wood based or wood containing products, such as particleboard, fiberboard, plywood, and oriented strand board, can have a thickness ranging from a low of about 1.5 mm, about 5 mm, or about 10 mm to a high of about 30 mm, about 50 mm, or about 100 mm. Wood based or wood containing products can be formed into sheets or boards. The sheets or boards can have a length of about 1.2 m, about 1.8 m, about 2.4 m, about 3 m, or about 3.6 m. The sheets or boards can have a width of about 0.6 m, about 1.2 m, about 1.8 m, about 2.4 m, or about 3 m.

Another lignocellulose composite product can include panels or other multi-layered products. For example, a lignocellulose product can include two, three, four, five, six, seven, eight, nine, ten, or more individual lignocellulose layers bonded together. The adhesive composition can be contacted with the lignocellulose substrates of any one or more of the individual layers. In one example, the individual lignocellulose layers of a multi-layer product can be veneer. In another example, the individual lignocellulose layers of a multi-layer product can include a plurality of lignocellulose substrates bonded to one another to produce an individual layer. In another example, a multi-layer lignocellulose product can include one or more individual layers that include veneer and one or more layers that include a plurality of lignocellulose substrates bonded to one another to produce an individual layer.

Another lignocellulose composite product can include two or more lignocellulose boards adhered to one another. For example two boards such as a common 2×4 board can be adhered or bonded to one another via the adhesive composition. As such, the composite products can include lignocellulose substrates of any size and/or shape, depending on the end product being made. Specific composite products made with the adhesive composition discussed and described herein can include, but are not limited to, glulam, wooden I-joists, and figure joints.

In one or more embodiments, the lignocellulose substrates can be mixed, blended, or otherwise combined with one or more polymers or plastics and a lignocellulose/polymer composite product can be made. Illustrative polymers or plastics can include, but are not limited to, polyethylene; polypropylene; polybutene-1 and copolymers of polybutene-1 with ethylene and/or propylene; polyisobutylene; butyl rubber; halobutyl rubber; copolymers of isobutylene and para-alkylstyrene; halogenated copolymers of isobutylene and para-alkylstyrene; natural rubber; polyisoprene; copolymers of butadiene with acrylonitrile, polychloroprene, alkyl acrylate rubber, chlorinated isoprene rubber, acrylonitrile chlorinated isoprene rubber, and polybutadiene rubber (both cis and trans); Engineering Thermoplastics such as polycarbonates, e.g. poly(bisphenol-a carbonate); polyamide resins, such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, and nylon 66/PPS copolymer; polyester resins, such as polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer, and other aromatic polyesters; nitrile resins, such as polyacrylonitrile (PAN), polymethacrylonitrile, styrene-acrylonitrile copolymers (SAN), methacrylonitrile-styrene copolymers, and methacrylonitrile-styrene-butadiene copolymers; acrylate resins, such as polymethyl methacrylate and polyethylacrylate; polyvinyl acetate (PVAc); polyvinyl alcohol (PVA); chloride resins, such as polyvinylidene chloride (PVDC), and polyvinyl chloride (PVC); fluoride resins, such as polyvinylidene fluoride (PVDF), polyvinyl fluoride (PVF), polychlorofluoroethylene (PCFE), and polytetrafluoroethylene (PTFE); cellulose resins, such as cellulose acetate and cellulose acetate butyrate; polyimide resins, including aromatic polyimides; polysulfones; polyacetals; polylactones; polyketones, including aromatic polyketones; polyphenylene oxide; polyphenylene sulfide; styrene resins, including polystyrene, styrene-maleic anhydride copolymers, and acrylonitrile-butadiene-styrene resin, or any mixture thereof.

If the composite product includes a mixture of lignocellulose substrates and plastic substrates the two components can be present in any desired amount. For example, the composite product can have a concentration of the lignocellulose substrate of from about 1 wt % to about 99 wt % and conversely about 99 wt % to about 1 wt % of the plastic. In another example, the amount of the lignocellulose substrate can range from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the combined weight of the lignocellulose substrates and the plastic substrates.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

The comparative example (C1) was prepared by mixing a phenol-resorcinol-formaldehyde resin and paraformaldehyde (hardener) to provide a comparative adhesive composition. The phenol-resorcinol-formaldehyde resin had a solids content of about 56 wt %, a pH of about 10, a viscosity of about 1,300 cP, and a molar ratio of phenol:resorcinol:formaldehyde of about 0.72:0.54:1. The paraformaldehyde was diluted to a solids concentration of about 50 wt % by mixing with a polyol. The paraformaldehyde/polyol mixture had a viscosity of about 4,500 cP, and a pH of about 5.5. Inventive examples (Ex. 1-8) were prepared with the same phenol-resorcinol-formaldehyde resin and hardener as the comparative example and further included diethylenetriamine (DETA) as the cure accelerant. The amount of DETA increased from 0.05 wt % (Ex. 1) to 0.4 wt % (Ex. 8) in 0.05 wt % increments, based on the combined weight of the phenol-resorcinol-formaldehyde resin and the DETA. The DETA was purchased from Huntsman Corporation and had a purity of 98.5%.

For the inventive examples (Ex. 1 to 8), 100 grams the phenol-resorcinol-formaldehyde and DETA mixture that contained the appropriate amounts of DETA, i.e., 0.05 wt % to 0.4 wt %, were each prepared in separate beakers. About 70 grams of each phenol-resorcinol-formaldehyde resin and DETA mixture was removed from each beaker and placed into a second beaker. About 30 grams of the hardener (diluted to a solids concentration of about 50 wt % by mixing with the polyol) was then added to each of the phenol-resorcinol-formaldehyde/DETA mixtures. The hardener and the phenol-resorcinol-formaldehyde resin/DETA mixtures were then mixed with one another to provide the inventive adhesive compositions. The relative amounts of each component combined with one another for the comparative example (C1) and the inventive examples (Ex. 1-8) are shown in the Table below. The gel time for each example was measured and the gel times are also shown in the Table below.

The gel time or "working life" of each example (C1 and Ex. 1-8) adhesive composition was measured according to the following procedure. Each adhesive composition was prepared in a 250 mL beaker. The gel time timer was started when the mixing of the phenol-formaldehyde resin/hardener (C1) and the phenol-formaldehyde/DETA mixture and hardener (Ex. 1-8) was started. The temperature of the adhesive composition was adjusted to and maintained at about 25° C. during the test. A no. 4 spindle, attached to a Brookfield viscometer, Model DV-II+, was inserted into the adhesive composition and centered therein. Rotation of the spindle was started and operated at a speed of about 20 rotations per minute. The viscosity of the adhesive composition was record about every 2 minutes until the viscosity reached about 100,000 cP. Table 1 below shows the measured viscosity increase over time.

TABLE 1

| | | Gel Time Test Results | | |
|---|---|---|---|---|
| Examples | PRF Resin, (g) | Hardener, (g) | Cure Accelerant, (g) | Cure Accelerant, (wt %) | Gel Time, (minutes) |
| C1 | 70.000 | 30.000 | None | None | 30 |
| Ex. 1 | 69.960 | 30.000 | 0.035 | 0.05 | 23 |
| Ex. 2 | 69.930 | 30.000 | 0.070 | 0.10 | 19 |
| Ex. 3 | 69.895 | 30.000 | 0.105 | 0.15 | 13 |
| Ex. 4 | 69.860 | 30.000 | 0.140 | 0.20 | 9 |
| Ex. 5 | 69.825 | 30.000 | 0.175 | 0.25 | 6 |
| Ex. 6 | 69.790 | 30.000 | 0.210 | 0.30 | 5 |
| Ex. 7 | 69.755 | 30.000 | 0.245 | 0.35 | 4 |
| Ex. 8 | 69.720 | 30.000 | 0.280 | 0.40 | 3 |

As shown in Table 1 above, each 0.05 wt % increase in the amount of DETA caused a surprising and unexpected significant decrease the gel time of the adhesive composition. For example, the gel time for Ex. 1 decreased from 30 minutes to 23 minutes, which was equal to a decrease in the gel time of 7 minutes or about 23.3%. The gel time for Ex. 5 decreased from 9 minutes (the gel time of Ex. 4 containing a 0.20 wt % DETA) to 6 minutes, which was equal to a decrease in 3 minutes or about 33.3%.

Example II

The gel time for another series of adhesive compositions (C2 and Ex. 9-14) was also measured to determine the repeatability of the first test discussed in Example I. The phenol-resorcinol-formaldehyde resin, DETA, and paraformaldehyde (hardener) were the same as used in Example I. The only difference between the examples was that the paraformaldehyde (hardener) from a different batch/lot was used, with the properties of the paraformaldehyde being the same as in Example I.

TABLE 2

| | | Gel Time Test Results | | |
|---|---|---|---|---|
| Examples | PRF Resin, (g) | Hardener, (g) | Cure Accelerant, (g) | Cure Accelerant, (wt %) | Gel Time, (minutes) |
| C2 | 70.000 | 30.000 | None | None | 30 |
| Ex. 9 | 69.930 | 30.000 | 0.070 | 0.10 | 19 |
| Ex. 10 | 68.895 | 30.000 | 0.105 | 0.15 | 13 |
| Ex. 11 | 69.825 | 30.000 | 0.175 | 0.25 | 6 |

TABLE 2-continued

Gel Time Test Results

| Examples | PRF Resin, (g) | Hardener, (g) | Cure Accelerant, (g) | Cure Accelerant (wt %) | Gel Time, (minutes) |
|---|---|---|---|---|---|
| Ex. 12 | 69.825 | 30.000 | 0.175 | 0.25 | 6 |
| Ex. 13 | 69.755 | 30.000 | 0.245 | 0.35 | 4 |
| Ex. 14 | 69.685 | 30.000 | 0.315 | 0.45 | 3 |

As shown in Table 2, the reduction in gel time of phenol-resorcinol-formaldehyde resin and paraformaldehyde (hardener) with the addition of DETA as a cure accelerant were the same as the gel times measured in Example I.

Example III

The effect the cure accelerant (DETA) had on the degree of sag exhibited by the adhesive composition was also evaluated. Comparative example C3 was the same comparative example C1 and the inventive examples Ex. 15 and Ex. 16 were prepared in the same manner as Examples 3 and 5 above, respectively. The results are shown in Table 3 below.

TABLE 3

| Example | Cure Accelerant, (wt %) | Adhesive Sag, (mm) | Standard Deviation |
|---|---|---|---|
| C3 | 0 | 78 | 10 |
| Ex. 15 | 0.15 | 65 | 4 |
| Ex. 16 | 0.25 | 66 | 2 |

As shown in Table 3, the presence of the cure accelerant produced adhesive compositions that tend to exhibit reduced sag as compared to the comparative adhesive C3 that did not include any cure accelerant (DETA) combined with the phenol-resorcinol-formaldehyde and hardener.

The sag for examples C3, Ex. 15, and Ex. 16 was determined according to the following procedure. A 15 inch surfaced (planed) 1 inch×6 inch red oak board equilibrated at a temperature of about 80° F. and a humidity of about 65% RH (11.7% equilibrium moisture content) was used to measure the sag of the adhesive compositions. The board had a straight line drawn along the length of the board about 1 inch from the edge on the 6 inch wide surface. About 20 grams of each adhesive to be tested was prepared for each test. About 2 minutes after mixing each adhesive, 6 drops of each adhesive (0.2 mL each) was applied along the line on the board, with the bottom edge of the drops touching the top edge of the line drawn on the board while the surface was horizontally oriented. About 1 minute after applying the drops of adhesive the board was re-oriented so that the surface on which the adhesive drops had been applied was vertically oriented. The adhesive drops were allowed to run down the side of the board for about 5 minutes and the board was then re-oriented so that the surface having the adhesive applied thereto was horizontally oriented. The length each adhesive drop ran down the side of the board was then measured. The sag values reported in Table 3 are the average of the 6 drops of each adhesive.

Embodiments of the present invention further relate to any one or more of the following paragraphs:

1. An adhesive composition, comprising a mixture of one or more phenolic-aldehyde resins and one or more cure accelerants selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, and any mixture thereof, wherein the one or more phenolic-aldehyde resins comprises at least two phenolic compounds selected from the group consisting of: phenol, resorcinol, hydroquinone, catechol, tannins, phloroglucinol, lignins, a bis-phenol, and humic acid.

2. An adhesive composition, comprising: one or more phenolic-aldehyde resins, wherein the one or more phenolic-aldehyde resins comprises at least two phenolic compounds selected from the group consisting of: phenol, resorcinol, hydroquinone, catechol, tannins, phloroglucinol, lignins, a bis-phenol, and humic acid; one or more hardeners comprising one or more alkylene group donors; and one or more cure accelerants selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, or any mixture thereof, wherein the one or more cure accelerants is present in an amount of from about 0.01 wt % to about 1 wt %, based on the combined solids weight of the one or more phenolic-aldehyde resins and the one or more cure accelerants 3. A method for making a composite product, comprising: contacting a plurality of substrates with an adhesive composition to provide a mixture, wherein the adhesive composition comprises: one or more phenolic-aldehyde resins and one or more cure accelerants, wherein the one or more cure accelerants is selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, or any mixture thereof, and wherein the one or more phenolic-aldehyde resins comprises at least two phenolic compounds selected from the group consisting of: phenol, resorcinol, hydroquinone, catechol, tannins, phloroglucinol, lignins, a bis-phenol, and humic acid; and at least partially curing the adhesive composition to produce a composite product.

4. A composite product, comprising: a plurality of substrates and a cured adhesive composition, wherein the adhesive composition, prior to curing, comprises: one or more phenolic-aldehyde resins and one or more cure accelerants, wherein the one or more cure accelerants is selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, or any mixture thereof, and wherein the one or more phenolic-aldehyde resins comprises at least two phenolic compounds selected from the group consisting of: phenol, resorcinol, hydroquinone, catechol, tannins, phloroglucinol, lignins, a bis-phenol, and humic acid.

5. The composition, method, or product according to any one of paragraphs 1 to 4, further comprising one or more hardeners comprising one or more alkylene group donors.

6. The composition, method, or product according to any one of paragraphs 1 to 5, further comprising one or more hardeners selected from the group consisting of: formaldehyde, paraformaldehyde, hexamethylenetetramine, 5-hydroxymethyl-1-aza-3,7-dioxabicyclo(3,3,0)octane, and mixture thereof.

7. The composition, method, or product according to any one of paragraphs 1 to 6, wherein the at least two phenolic compounds comprise phenol and resorcinol.

8. The composition, method, or product according to any one of paragraphs 1 to 7, wherein the phenolic-aldehyde resin comprises phenol-resorcinol-formaldehyde.

9. The composition, method, or product according to any one of paragraphs 1 to 8, wherein the one or more cure accelerants comprises ammonium hydroxide.

10. The composition, method, or product according to any one of paragraphs 1 to 9, wherein the one or more cure accelerants comprises one or more primary amines having the formula $NH_2R_1$, one or more secondary amines having the formula $NHR_1R_2$, one or more tertiary amines having the formula $NR_1R_2R_3$, or any mixture thereof, wherein each $R_1$, $R_2$, and $R_3$ is independently selected from alkyls, cycloalkyls, heterocycloalkyls, aryls, heteroaryls, and substituted aryls.

11. The composition, method, or product according to any one of paragraphs 1 to 10, wherein the one or more cure accelerants comprises one or more alkanolamines, and wherein the one or more alkanolamines comprises monoethanolamine, diethanolamine, triethanolamine, 2-(2-aminoethoxy)ethanol, aminoethyl ethanolamine, aminobutanol, or any mixture thereof.

12. The composition, method, or product according to any one of paragraphs 1 to 11, wherein the one or more cure accelerants comprises one or more aromatic amines, and wherein the one or more aromatic amines comprises benzyl amine, aniline, ortho-toluidine, meta-toluidine, para-toluidine, n-methyl aniline, N—N'-dimethyl aniline, diphenyl and triphenyl amines, 1-naphthylamine, 2-naphthylamine, 4-aminophenol, 3-aminophenol, 2-aminophenol, or any mixture thereof.

13. The composition, method, or product according to any one of paragraphs 1 to 12, wherein the one or more cure accelerants comprises one or more polyamines, and wherein the one or more polyamines comprises diethylenetriamine, triethylenetetramine, tetraethylenepentamine, 1,3-propanediamine, 1,4-butanediamine, polyamidoamines, polyethylenimines, or any mixture thereof.

14. The composition, method, or product according to any one of paragraphs 1 to 13, wherein the one or more cure accelerants comprises one or more amides, and wherein the one or more amides comprises acetamide, ethanamide, dicyandiamide, or any mixture thereof.

15. The composition, method, or product according to any one of paragraphs 1 to 14, further comprising one or more hardeners, wherein the adhesive composition has a molar ratio of total aldehyde compounds to total phenolic compounds ranging from about 0.5:1 to a about 1.5:1.

16. The composition, method, or product according to any one of paragraphs 1 to 15, wherein the phenolic-aldehyde resin comprises a phenol-resorcinol-aldehyde resin having a molar ratio of phenol:resorcinol:aldehyde of about 0.6-1.2: 0.2-0.8:1.

17. The composition, method, or product according to any one of paragraphs 1 to 16, wherein the adhesive composition has a concentration of the cure accelerant ranging from about 0.01 wt % to about 1 wt %, based on the solids weight of the phenolic-aldehyde resin and the cure accelerant.

18. The composition, method, or product according to any one of paragraphs 1 to 17, further comprising one or more hardeners, wherein the adhesive composition has a gel time ranging from about 2 minutes to about 180 minutes.

19. The composition, method, or product according to any one of paragraphs 1 to 18, further comprising one or more hardeners, wherein the adhesive composition has a gel time ranging from about 2 minutes to about 90 minutes.

20. The composition, method, or product according to any one of paragraphs 1 to 19, further comprising one or more hardeners, wherein the adhesive composition has a gel time ranging from about 2 minutes to about 60 minutes.

21. The composition, method, or product according to any one of paragraphs 1 to 20, wherein the adhesive composition has a shelf life of at least 1 month.

22. The composition, method, or product according to any one of paragraphs 1 to 21, wherein the adhesive composition has a shelf life of at least 6 months.

23. The composition, method, or product according to any one of paragraphs 1 to 22, wherein the one or more phenolic-aldehyde resins has a weight average molecular weight of about 250 to about 10,000 when mixed with the one or more cure accelerants.

24. The composition, method, or product according to any one of paragraphs 1 to 23, wherein the one or more phenolic-aldehyde resins has a viscosity of about 500 cP to about 10,000 cP when mixed with the one or more cure accelerants.

25. The composition, method, or product according to any one of paragraphs 1 to 24, further comprising one or more hardeners, wherein the adhesive composition has a concentration of metal ions that is less than about 3.5 wt % based on a total solids concentration of the adhesive composition.

26. The method or product according to any one of paragraphs 3 to 25, wherein curing the adhesive composition comprises heating the mixture to a temperature of about 15° C. to about 300° C.

27. The method or product according to any one of paragraphs 3 to 26, further comprising one or more hardeners, wherein curing the adhesive composition comprises directing radio waves toward the adhesive composition, and wherein the curing is free from any electric arcing.

28. The method or product according to any one of paragraphs 3 to 27, further comprising one or more hardeners, wherein curing the adhesive composition comprises directing microwaves toward the adhesive composition, and wherein the curing is free from any electric arcing.

29. The method or product according to any one of paragraphs 3 to 28, wherein the substrates comprise lignocellulose substrates.

30. The method or product according to any one of paragraphs 3 to 29, wherein the composite product is a structural composite product.

31. The method or product according to any one of paragraphs 3 to 30, wherein the composite product is a particleboard, a fiberboard, a plywood, an oriented strand board, a laminated veneer lumber, a laminated veer board, a glulam beam, an I-beam, or structural finger joints.

32. An adhesive composition, comprising a mixture of one or more tannins, one or more lignins, or a combination thereof and or more cure accelerants selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, or any mixture thereof.

33. The adhesive composition according to paragraph 32, further comprising one or more hardeners comprising one or more alkylene group donors.

34. The adhesive composition according to paragraph 32 or 33, further comprising one or more hardeners selected from the group consisting of: formaldehyde, paraformaldehyde, hexamethylenetetramine, and any mixture thereof.

35. The adhesive composition according to any one of paragraphs 32 to 34, wherein the one or more cure accelerants comprises ammonium hydroxide.

36. The adhesive composition according to any one of paragraphs 32 to 35, wherein at least one of the one or more primary amines, the one or more secondary amines, and the one or more tertiary amines is present, and wherein the one or more primary amines have the formula $NH_2R_1$, the one or more secondary amines have the formula $NHR_1R_2$, and the one or more tertiary amines have the formula $NR_1R_2R_3$, wherein each $R_1$, $R_2$, and $R_3$ is independently selected from alkyls, cycloalkyls, heterocycloalkyls, aryls, heteroaryls, and substituted aryls.

37. The adhesive composition according to any one of paragraphs 32 to 36, wherein the one or more alkanolamines is present, and wherein the one or more alkanolamines comprises monoethanolamine, diethanolamine, triethanolamine, 2-(2-aminoethoxy)ethanol, aminoethyl ethanolamine, aminobutanol, or any mixture thereof.

38. The adhesive composition according to any one of paragraphs 32 to 37, wherein the one or more aromatic amines is present, and wherein the one or more aromatic amines comprises benzyl amine, aniline, ortho-toluidine, meta-toluidine, para-toluidine, n-methyl aniline, N—N'-dimethyl aniline, diphenyl and triphenyl amines, 1-naphthylamine, 2-naphthylamine, 4-aminophenol, 3-aminophenol, 2-aminophenol, or any mixture thereof.

39. The adhesive composition according to any one of paragraphs 32 to 38, wherein the one or more polyamines is present, and wherein the one or more polyamines comprises diethylenetriamine, triethylenetetramine, tetraethylenepentamine, 1,3-propanediamine, 1,4-butanediamine, polyamidoamines, polyethylenimines, or any mixture thereof.

40. The adhesive composition according to any one of paragraphs 32 to 39, wherein the one or more amides is present, and wherein the one or more amides comprises acetamide, ethanamide, dicyandiamide, or any mixture thereof.

41. The adhesive composition according to any one of paragraphs 32 to 40, further comprising one or more hardeners, wherein the adhesive composition has a molar ratio of total aldehyde compounds to total phenolic compounds ranging from about 1:1 to a about 1.7:1.

42. The adhesive composition according to any one of paragraphs 32 to 41, wherein the phenolic-aldehyde resin comprises a phenol-resorcinol-aldehyde resin having a molar ratio of phenol:resorcinol:aldehyde of about 0.3-1.5:0.3-0.8:1.

43. The adhesive composition according to any one of paragraphs 32 to 42, wherein the adhesive composition has a concentration of the cure accelerant ranging from about 0.01 wt % to about 1 wt %, based on the solids weight of the phenolic-aldehyde resin and the cure accelerant.

44. The adhesive composition according to any one of paragraphs 32 to 43, further comprising one or more hardeners, wherein the adhesive composition has a gel time ranging from about 2 minutes to about 300 minutes.

45. The adhesive composition according to any one of paragraphs 32 to 44, further comprising one or more hardeners, wherein the adhesive composition has a gel time ranging from about 2 minutes to about 90 minutes.

46. The adhesive composition according to any one of paragraphs 32 to 45, further comprising one or more hardeners, wherein the adhesive composition has a gel time ranging from about 2 minutes to about 60 minutes.

47. The adhesive composition according to any one of paragraphs 32 to 46, wherein the adhesive composition has a shelf life of at least 1 month.

48. The adhesive composition according to any one of paragraphs 32 to 47, wherein the adhesive composition has a shelf life of at least 6 months.

49. The adhesive composition according to any one of paragraphs 32 to 48, further comprising one or more hardeners, wherein the adhesive composition has a concentration of metal ions that is less than about 3.5 wt % based on a total solids concentration of the adhesive composition.

50. The adhesive composition, method, or product according to any one of paragraphs 1 to 31 or 49, wherein the phenolic-aldehyde resin comprises a phenol-resorcinol-aldehyde resin having a molar ratio of phenol:resorcinol:aldehyde of about 0.3-1.5:0.2-0.8:1.

51. The adhesive composition, method, or product according to any one of paragraphs 1 to 31, 49, or 50, wherein the phenolic-aldehyde resin comprises a phenol-resorcinol-aldehyde resin having a molar ratio of phenol:resorcinol:aldehyde of about 0.3-1.5:0.3-0.8:1.

52. An adhesive composition, comprising a mixture of one or more phenolic-aldehyde resins and one or more cure accelerants selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, and any mixture thereof.

53. A method for making a composite product, comprising: contacting a plurality of substrates with an adhesive composition to provide a mixture, wherein the adhesive composition comprises: one or more phenolic-aldehyde resins and one or more cure accelerants, wherein the one or more cure accelerants is selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, and any mixture thereof; and at least partially curing the adhesive composition to produce a composite product.

54. A composite product, comprising: a plurality of substrates and a cured adhesive composition, wherein the adhesive composition, prior to curing, comprises: one or more phenolic-aldehyde resins and one or more cure accelerants, wherein the one or more cure accelerants is selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, and any mixture thereof.

55. The adhesive composition, method, or composite product according to any one of paragraphs 52 to 54, wherein the one or more phenolic-aldehyde resins is selected from the group consisting of: phenol-aldehyde resin, resorcinol-aldehyde resin, hydroquinone-aldehyde resin, tannin-aldehyde resin, phloroglucinol-aldehyde resin, lignin-aldehyde resin, a bis-phenol-aldehyde resin, and a humic acid-aldehyde resin.

56. The adhesive composition, method, or composite product according to any one of paragraphs 52 to 55, wherein the phenolic-aldehyde resin comprises an aldehyde compound selected from the group consisting of: formaldehyde, paraformaldehyde, acetaldehyde, propionaldehyde, butyraldehyde, furfuraldehyde, benzaldehyde, glyoxal urea-formaldehyde concentrate (UFC), and any mixture thereof.

57. The adhesive composition, method, or composite product according to any one of paragraphs 52 to 56, wherein the one or more cure accelerants comprises ammonium hydroxide.

58. The adhesive composition, method, or composite product according to any one of paragraphs 52 to 57, wherein the one or more cure accelerants comprises one or more primary amines having the formula $NH_2R_1$, one or more secondary amines having the formula $NHR_1R_2$, one or more tertiary amines having the formula $NR_1R_2R_3$, or any mixture thereof, wherein each $R_1$, $R_2$, and $R_3$ is independently selected from alkyls, cycloalkyls, heterocycloalkyls, aryls, heteroaryls, and substituted aryls.

59. The adhesive composition, method, or composite product according to any one of paragraphs 52 to 58, wherein the one or more cure accelerants comprises one or more alkanolamines, and wherein the one or more alkanolamines comprises monoethanolamine, diethanolamine, triethanolamine, 2-(2-aminoethoxy)ethanol, aminoethyl ethanolamine, aminobutanol, or any mixture thereof.

60. The adhesive composition, method, or composite product according to any one of paragraphs 52 to 59, wherein the one or more cure accelerants comprises one or more aromatic amines, and wherein the one or more aromatic amines comprises benzyl amine, aniline, ortho-toluidine, meta-toluidine, para-toluidine, n-methyl aniline, N—N'-dimethyl aniline, diphenyl and triphenyl amines, 1-naphthylamine, 2naphthylamine, 4-aminophenol, 3-aminophenol, 2-aminophenol, or any mixture thereof.

61. The adhesive composition, method, or composite product according to any one of paragraphs 52 to 60, wherein the one or more cure accelerants comprises one or more polyamines, and wherein the one or more polyamines comprises diethylenetriamine, triethylenetetramine, tetraethylenepentamine, 1,3-propanediamine, 1,4-butanediamine, polyamidoamines, polyethylenimines, or any mixture thereof.

62. The adhesive composition, method, or composite product according to any one of paragraphs 52 to 61, wherein the one or more cure accelerants comprises one or more amides, and wherein the one or more amides comprises acetamide, ethanamide, dicyandiamide, or any mixture thereof.

63. The adhesive composition, method, or composite product according to any one of paragraphs 52 to 62, wherein the one or more phenolic-aldehyde resins has a weight average molecular weight of about 250 to about 10,000 when mixed with the one or more cure accelerants.

64. The adhesive composition, method, or composite product according to any one of paragraphs 52 to 63, wherein the one or more phenolic-aldehyde resins has a viscosity of about 500 cP to about 10,000 cP when mixed with the one or more cure accelerants.

65. The adhesive composition, method, or composite product according to any one of paragraphs 52 to 64, further comprising one or more hardeners, wherein the adhesive composition has a concentration of metal ions that is less than about 3.5 wt % based on a total solids concentration of the adhesive composition.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A composition, comprising a mixture of one or more phenolic-aldehyde resins and one or more cure accelerants selected from the group consisting of:

ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, and any mixture thereof, wherein the one or more phenolic-aldehyde resins comprises at least two phenolic compounds selected from the group consisting of: phenol, resorcinol, hydroquinone, catechol, tannins, phloroglucinol, lignins, a bis-phenol, and humic acid, wherein the one or more phenolic-aldehyde resins has a molar ratio of an aldehyde component to a phenolic component of about 0.2:1 to about 0.9:1, wherein the composition is free of a hardener comprising one or more alkylene group donors, wherein the one or more phenolic-aldehyde resins has a pH of about 8.5 to about 11.5, and wherein the one or more phenolic-aldehyde resins and the one or more cure accelerants are substantially unreactive with one another in the absence of the hardener.

2. The composition of claim 1, wherein the at least two phenolic compounds comprise phenol and resorcinol, wherein the one or more cure accelerants comprises the one or more polyamines, wherein the one or more polyamines comprises diethylenetriamine, triethylenetetramine, tetraethylenepentamine, 1,3-propanediamine, 1,4-butanediamine, polyamidoamines, polyethylenimines, or any mixture thereof, and wherein the one or more phenolic-aldehyde resins has a viscosity of about 500 cP to about to about 3,000 cP at a temperature of about 25° C.

3. The composition of claim 1, wherein the at least two phenolic compounds comprise phenol and resorcinol, wherein the one or more cure accelerants comprises the one or more polyamines, wherein the one or more polyamines comprises diethylenetriamine, and wherein the one or more phenolic-aldehyde resins has a pH of about 9 to about 11.

4. The composition of claim 1, wherein the one or more cure accelerants comprises ammonium hydroxide, and wherein the one or more phenolic-aldehyde resins comprises a phenol-resorcinol-aldehyde resin having a concentration of phenol of about 43.5 wt % to about 59.5 wt %, a concentration of resorcinol of about 25 wt % to about 45 wt %, and an aldehyde concentration of about 16.6 wt % to about 17.1 wt %, based on a total solids weight of the phenol-resorcinol-aldehyde resin.

5. The composition of claim 1, wherein the one or more aromatic amines is present, and wherein the one or more aromatic amines comprises benzyl amine, ortho-toluidine, meta-toluidine, para-toluidine, n-methyl aniline, N—N'-dimethyl aniline, diphenyl and triphenyl amines, 1-naphthylamine, 2-naphthylamine, 4-aminophenol, 3-aminophenol, 2-aminophenol, or any mixture thereof.

6. The composition of claim 1, wherein the one or more polyamines is present, and wherein the one or more polyamines comprises diethylenetriamine, triethylenetetramine, tetraethylenepentamine, 1,3 -propanediamine, 1 ,4butanediamine, polyamidoamines, polyethylenimines, or any mixture thereof.

7. The composition of claim 1, wherein the one or more amides is present, and wherein the one or more amides comprises ethanamide.

8. The composition of claim 1, wherein the one or more phenolic-aldehyde resins comprises a phenol-resorcinol-aldehyde resin having a molar ratio of phenol:resorcinol:aldehyde of about 0.6-1.2:0.2-0.8:1, a weight average molecular weight of about 700 to about 7,000, and a pH of about 9 to about 11, and wherein the adhesive composition has a solids concentration of about 40 wt % to about 60 wt % and a viscosity of about 500 cP to about 5,000 cP at a temperature of 25° C.

9. The composition of claim 1, wherein the composition comprises about 0.01 wt % to about 0.4 wt % of the one or more cure accelerants based on the combined solids weight of the one or more phenolic-aldehyde resins and the one or more cure accelerants.

10. The composition of claim 9, wherein the one or more cure accelerants comprises the one or more polyamines, and wherein the adhesive composition has a shelf life of at least 1 month.

11. The composition of claim 1, wherein the composition has a concentration of metal ions that is less than 3.5 wt % based on a total solids concentration of the composition, and wherein the one or more phenolic-aldehyde resins comprises a base in an amount of about 2% to about 8%, based on the weight of the one or more phenolic-aldehyde resins.

12. A composition, comprising:
one or more phenolic-aldehyde resins, wherein the one or more phenolic-aldehyde resins comprises at least two phenolic compounds selected from the group consisting of: phenol, resorcinol, hydroquinone, catechol, tannins, phloroglucinol, lignins, a bis-phenol, and humic acid, and wherein the one or more phenolic-aldehyde resins has a pH of about 8.5 to about 11.5 and a molar ratio of an aldehyde component to a phenolic component of about 0.2:1 to about 0.9:1; and
one or more cure accelerants selected from the group consisting of: ammonia, ammonium hydroxide, one or more primary amines, one or more secondary amines, one or more tertiary amines, one or more alkanolamines, one or more aromatic amines, one or more polyamines, one or more amides, one or more polyamides, one or more compounds containing at least one amine functional group and at least one sulfur functional group, or any mixture thereof, wherein the one or more cure accelerants is present in an amount of from about 0.01 wt % to about 1 wt %, based on the combined solids weight of the one or more phenolic-aldehyde resins and the one or more cure accelerants, wherein the composition is free of a hardener comprising one or more alkylene group donors and has a shelf life of at least 1 month, and wherein the one or more phenolic-aldehyde resins and the one or more cure accelerants are substantially unreactive with one another in the absence of the hardener.

13. The composition of claim 12, wherein the one or more cure accelerants comprises the one or more polyamines, wherein the one or more polyamines comprises diethylenetriamine, triethylenetetramine, tetraethylenepentamine, 1,3-propanediamine, 1,4-butanediamine, polyamidoamines, polyethylenimines, or any mixture thereof, and wherein the one or more cure accelerants is present in an amount of from about 0.01 wt % to about 0.4 wt %, based on the combined solids weight of the one or more phenolic-aldehyde resins and the one or more cure accelerants.

14. The composition of claim 12, wherein the one or more cure accelerants comprises the one or more polyamines, wherein the one or more polyamines comprises diethylenetriamine, wherein the molar ratio of the aldehyde component to the phenolic component is about 0.55:1 to about 0.8:1, and wherein the at least two phenolic compounds comprise phenol and resorcinol.

15. The composition of claim 12, wherein the at least two phenolic compounds comprise phenol and resorcinol, wherein the one or more cure accelerants comprises the one or more polyamines, and wherein the one or more polyamines comprises diethylenetriamine, and wherein the one or more phenolic-aldehyde resins has a viscosity of about 500 cP to about to about 3,000 cP at a temperature of about 25° C., a pH of about 9 to about 11, and comprises a base in an amount of about 2% to about 8%, based on the weight of the one or more phenolic-aldehyde resins.

16. A composition comprising a mixture of diethylenetriamine and a phenol-resorcinol-aldehyde resin having a molar ratio of phenol:resorcinol:aldehyde of about 0.6-1.2:0.2-0.8:1, a weight average molecular weight of about 700 to about 7,000, and a pH of about 8.5 to about 11, wherein a molar ratio of the aldehyde to a sum of the phenol and resorcinol is about 0.2:1 to about 0.9:1, and wherein the composition is free of a hardener comprising one or more alkylene group donors, has a shelf life of at least 6 months, has a solids concentration of about 40 wt % to about 60 wt %, has a viscosity of about 500 cP to about 3,000 cP at a temperature of 25° C., and comprises about 0.01 wt % to about 0.4 wt % diethylenetriamine based on the combined solids weight of the phenol-resorcinol-aldehyde resin and the diethylenetriamine.

17. The composition of claim 16, further comprising a filler in an amount of about 5 wt % to about 45 wt % based on the combined weight of the filler and the phenol-resorcinol-aldehyde resin, wherein the filler comprises one or more nut shells, one or more seed shells, one or more fruit pits, animal bones, clay, ground corn cobs, or any mixture thereof.

18. The composition of claim 1, wherein the molar ratio of the aldehyde component to the phenolic component is about 0.55:1 to about 0.8:1.

19. The composition of claim 9, wherein the one or more phenolic-aldehyde resins and the one or more cure accelerants do not react with one another in the absence of the hardener.

20. The composition of claim 12, wherein the one or more phenolic-aldehyde resins and the one or more cure accelerants do not react with one another in the absence of the hardener.

* * * * *